US010279246B2

(12) United States Patent
Sakamoto et al.

(10) Patent No.: US 10,279,246 B2
(45) Date of Patent: *May 7, 2019

(54) GAME MACHINE INPUT DEVICE AND GAME MACHINE

(71) Applicant: OMRON Corporation, Kyoto-shi, Kyoto (JP)

(72) Inventors: Hitoshi Sakamoto, Ichinomiya (JP); Masaki Mizutani, Ichinomiya (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/657,422

(22) Filed: Jul. 24, 2017

(65) Prior Publication Data

US 2018/0056177 A1  Mar. 1, 2018

(30) Foreign Application Priority Data

Aug. 31, 2016 (JP) ................................. 2016-170234

(51) Int. Cl.
*A63F 13/24* (2014.01)
*G07F 17/32* (2006.01)
*A63F 9/24* (2006.01)
*H01H 3/00* (2006.01)
*H01H 13/02* (2006.01)
*A63F 7/02* (2006.01)
*G05G 9/047* (2006.01)

(52) U.S. Cl.
CPC ................ *A63F 9/24* (2013.01); *A63F 7/022* (2013.01); *G07F 17/32* (2013.01); *H01H 3/00* (2013.01); *H01H 13/023* (2013.01); *A63F 13/24* (2014.09); *A63F 2009/2402* (2013.01); *A63F 2009/2451* (2013.01); *A63F 2300/1056* (2013.01); *G05G 2009/0474* (2013.01); *H01H 2013/026* (2013.01); *H01H 2231/008* (2013.01)

(58) Field of Classification Search
CPC .................................................... G07F 17/3211
See application file for complete search history.

(56) References Cited

U.S. PATENT DOCUMENTS

| 9,126,113 | B2 * | 9/2015 | Johnson | ................... A63F 13/08 |
| 2010/0248808 | A1 * | 9/2010 | Barker | ................ G07F 17/3211 463/20 |
| 2011/0269543 | A1 * | 11/2011 | Johnson | ............... G07F 17/3209 463/37 |
| 2012/0088567 | A1 * | 4/2012 | Aoki | ................... G07F 17/3211 463/20 |
| 2012/0149457 | A1 * | 6/2012 | Loose | ................... G07F 17/322 463/25 |

(Continued)

FOREIGN PATENT DOCUMENTS

| JP | 2009-131509 A | 6/2009 |
| JP | 2011-104175 A | 6/2011 |
| JP | 2012-045338 A | 3/2012 |

*Primary Examiner* — Jay Trent Liddle
(74) *Attorney, Agent, or Firm* — Metrolexis Law Group, PLLC

(57) ABSTRACT

A game machine input device mounted on a game machine provided with a playfield; the game machine input device includes: an input unit provided toward the front of the playfield and configured to accept input; and a projection part configured to radiate light toward the playfield to project a first image in a region within the visual field of a player viewing the playfield.

7 Claims, 30 Drawing Sheets

(56) References Cited

U.S. PATENT DOCUMENTS

2015/0009575 A1* 1/2015 Kitamura ........... G02B 27/0101
359/633
2015/0018092 A1* 1/2015 Kitamura ............ G07F 17/3211
463/30

* cited by examiner

GAME MACHINE INPUT DEVICE AND GAME MACHINE

CROSS REFERENCE TO RELATED APPLICATIONS

This application claims priority from prior Japanese Patent Application No. 2016-170234 filed with the Japan Patent Office on Aug. 31, 2016, the entire contents of which are incorporated herein by reference.

FIELD

The disclosure relates to a game machine input device and a game machine.

BACKGROUND

Various types of game machines such as pachinko machines and slot machines are provided with game machine input device with an input unit that blinks or provides other presentation effects to invoke a sense of anticipation for the game in the player.

This game machine input device may be a button device equipped with a button unit that serves as the input unit, or a lever input device provided with a lever unit. One existing method of presenting an effect involves illuminating the input unit, or providing the input unit with a display screen whereon an image is displayed.

For instance, Japanese Patent Publication No. 2012-045338 describes a button device where the button unit is equipped with a projection unit and a liquid crystal display device in addition to providing a screen surface on the button unit to act as a display surface. The projection unit radiates light so that an image shown on the liquid crystal display device is shown on the screen surface.

Japanese Patent Publication No. 2009-131509 discloses a lever input device capable of illuminating a spherical input element provided at the tip end of the lever unit. Japanese Patent Publication No. 2011-104175 discloses a lever input device provided with a plurality of light emitting units surrounding the lever unit to illuminate around a lever input unit.

Technical Problem

As is the case in Japanese Patent Publication No. 2012-045338, the button device is often provided on the lower part of the playfield even when the same is located on the front surface of the game machine.

However, usually the player plays the game focused on the playfield, i.e., watching the movement of the pinball falling through the play area of the playfield and the effects presented on the display screen provided on the playfield. Therefore, the button device placed at the lower part of the playfield receives no attention, and thus a player also tends not to notice an image shown on the screen surface of the button unit.

Each of the lever input devices in Japanese Patent Publication No. 2009-131509 and Japanese Patent Publication No. 2011-104175 face a similar problem. Despite illuminating the input element at the tip of the lever unit, or illuminate around the lever input unit, a player focused on the playfield tends not to notice the input unit.

Consequently, a common practice is to show information on a display screen to prompt a player to operate the liquid crystal button device or the lever input device on the playfield.

Embodiments of the present invention address the foregoing by providing a game machine input device and a game machine that allow a player to notice the presence of the game machine input device, and achieves impactful presentation without needing to provide a display screen on the playfield to shown an image prompting input even if, for instance, the player is focused on the playfield.

SUMMARY

A game machine input device according to embodiments of the present invention may be mounted on a game machine provided with a playfield; the game machine input device is provided with: an input unit provided toward the front of the playfield and configured to accept input; and a projection part configured to radiate light toward the playfield to project a first image in a region within the visual field of a player viewing the playfield.

The above configuration radiates light from the projection part toward the player, and the first image is projected and displayed in a region within the visual field of a player viewing the playfield. Accordingly, even if for instance the player is focused on the playfield is able to see a display of the first image.

It is thus possible to provide a new and impactful presentation, namely, the display of images by radiating light from this novel game machine input device toward the playfield; it is also thus possible to achieve a wider variety of presentation effects in a game machine provided with this novel game machine input device.

Since the game machine input device acts as a source of illumination for producing the first image, this creates awareness of the game machine input device, naturally prompting a player to focus on and operate the game machine input device without requiring some other means such as displaying an image on the display screen provided on the playfield to urge the player to use the input unit.

In this case, for instance, presenting the first image may serve to prompt input via the input unit, thereby ensuring input via the input unit. The display screen also no longer needs to display an image prompting input via the input unit; therefore, the display screen may be used for other presentation effects, thus increasing the variety of presentation effects that may be built into the pachinko machine.

The game machine input device according embodiments of the present invention may further include: a transparent panel covering the front of the playfield in the game machine; wherein the projection part is configured to radiate light toward the transparent panel; and to produce the first image the projection part causes light to reflect from the transparent panel and thereby projects an image that can be seen by a player.

This configuration displays a first image that is visible to the player by causing light to reflect from a transparent panel, which is laid over the playfield. It is thus possible to provide new and impactful presentation from a novel game machine input device, namely, using the reflection from the transparent panel to display an image.

The game machine input device according embodiments of the present invention may be further configured so that the projection part includes: a light source; a light guiding lens configured to output light introduced at one end thereof by the light source from another end that serves as an output surface with the output surface arranged toward the playfield; and an image holder arranged in the direction light is output from output surface of the light guiding lens, and configured to retain the first image.

The above configuration uses a light guiding lens where light from a light source is introduced at one end of the light guiding lens and exits from the other end thereof, and therefore reduces any losses as far as possible while contributing to the (radiation of) light used to display the first image. The shape of the light guiding lens also determines the position at which the (radiation of) light used to display the first image will strike the transparent panel, and therefore facilitates display of (radiation of light producing) the first image at a desired location on the transparent panel.

The first image retained by the image holder may also be modified. Hereby, the first image shown on the transparent panel may be changed easily to allow the use of common components for different types of game machines, thereby controlling costs and making it possible to provide presentation effects according to the type of game machine.

The game machine input device according embodiments of the present invention may be further configured so that the input unit is in button unit configured to move when pressed; the button unit including: a transparent support shaped like an inverted cup with a top surface retaining a decorative image that can be made directly visible to the player; the transparent support serving as the image holder, with a section from the top surface of the transparent support to a trunk thereof inclined or rounded and configured to retain a projection image for projecting the first image; and the light guiding lens arranged toward the inside of the transparent support.

In the above mentioned configuration, the button unit includes a transparent support that functions as an image holder with the light guiding lens arranged on the inside. The transparent support is shaped like an inverted cup and includes a section that is inclined or rounded from a top surface to the trunk. The top surface of the transparent support retains a decorative image that can be rendered directly perceivable to the player and a section thereof incline or rounded from the top surface of the transparent support retains a projection image. The configuration minimizes the number of parts required when compared to a separately provided image holder. The transparent support has the added function of displaying a first image because the light guiding lens is arranged on the inside thereof, and as a consequence the game machine input device may be provided with a compact button unit.

The game machine input device according embodiments of the present invention may be further configured so that the output surface of the light guiding lens creates a circular or rectangular border; and the transparent support further configured to hold a second image at the section that is inclined or rounded, the second image configured to be directly visible to a player via light output by the light guiding lens.

Outside of the first image displayed on the transparent panel, the above configuration uses light from the light guiding lens to display a second image which is directly perceivable by the player in all directions from the button unit; therefore, the above configuration makes it possible to provide more impactful presentation.

The game machine input device according embodiments of the present invention may be further configured so that the projection image or, if a second image is present the second image, or both the projection image and the second image are processed to reduce the visibility thereof due light other than light output from the light guiding lens.

There is the risk that projection image and second image may not also be visible when light radiates from or enters the transparent support to display the decorative image; in those cases the effects presented by the first image and the second image displayed via light from the light guiding lens is undeniably less effective.

The above configuration processes the projection image, the second image, or both the projection image and the second image so that the same are less visible by way of light other than light output from the light guiding lens; it is therefore possible to avoid the first image and the second image displayed due to light from the light guiding lens from being less effective.

The game machine input device according to embodiments of the present invention may be provided to a game machine. It is thus possible to provide a game machine capable of a larger variety presentation effects.

Effects

Embodiments of the present invention provide a game machine input device and a game machine that allow a player to notice the presence of the game machine input device, and achieves impactful presentation without needing to provide a display screen on the playfield to shown an image display or the like to prompt input even if, for instance, the player is focused on the playfield.

BRIEF DESCRIPTION OF THE DRAWINGS

FIG. 3A is an exploded perspective view from the top and FIG. 3B is an exploded perspective view from the bottom;

FIG. 7A is an exploded perspective view from the top and FIG. 7B is an exploded perspective view from the bottom;

FIG. 11A is an exploded perspective view from the top and FIG. 11B is an exploded perspective view from the bottom;

FIG. 14A is a view the button device from above, and FIG. 14B is a view of the button device from the side;

FIG. 18A illustrates how light is output by the light diffusing pattern; FIG. 18B illustrates how the pattern appears when the light source is activated; and FIG. 18C illustrates how the pattern appears when the light source is deactivated;

FIG. 19A is a view of the button device from above, and FIG. 19B is a view of the button device from the side;

DETAILED DESCRIPTION

Embodiments of the present invention are described in detail with reference to the drawings. While the following embodiments provide a button device equipped with a button input unit as an example of the game machine input device, another type of game machine input device such as lever input device equipped with a lever input unit may also be adopted. In other words, a game machine input device may be adopted if it the same can be placed on the front of a game machine. A projection part that radiates light toward a transparent panel covering the front of the playfield with light reflected from the transparent panel rendering a first image visible is also provided as one example a projection part that radiates light in the direction of the playfield. However, the projection part may project the first image on the resin portion of a front frame on a front door where the front frame surrounds the playfield. Alternatively, the projection part may project the first image on a screen provided on the front frame or therearound. Finally, while a pachinko machine is described in the embodiments as an example of the game machine into which the game machine input device may be installed, the game machine input device may be adopted in any game machine including a transparent panel such as glass to cover the playfield such as in a slot machine or the like.

First Embodiment

1. Overview and Configuration of the Pachinko Machine 100

Figure 1:
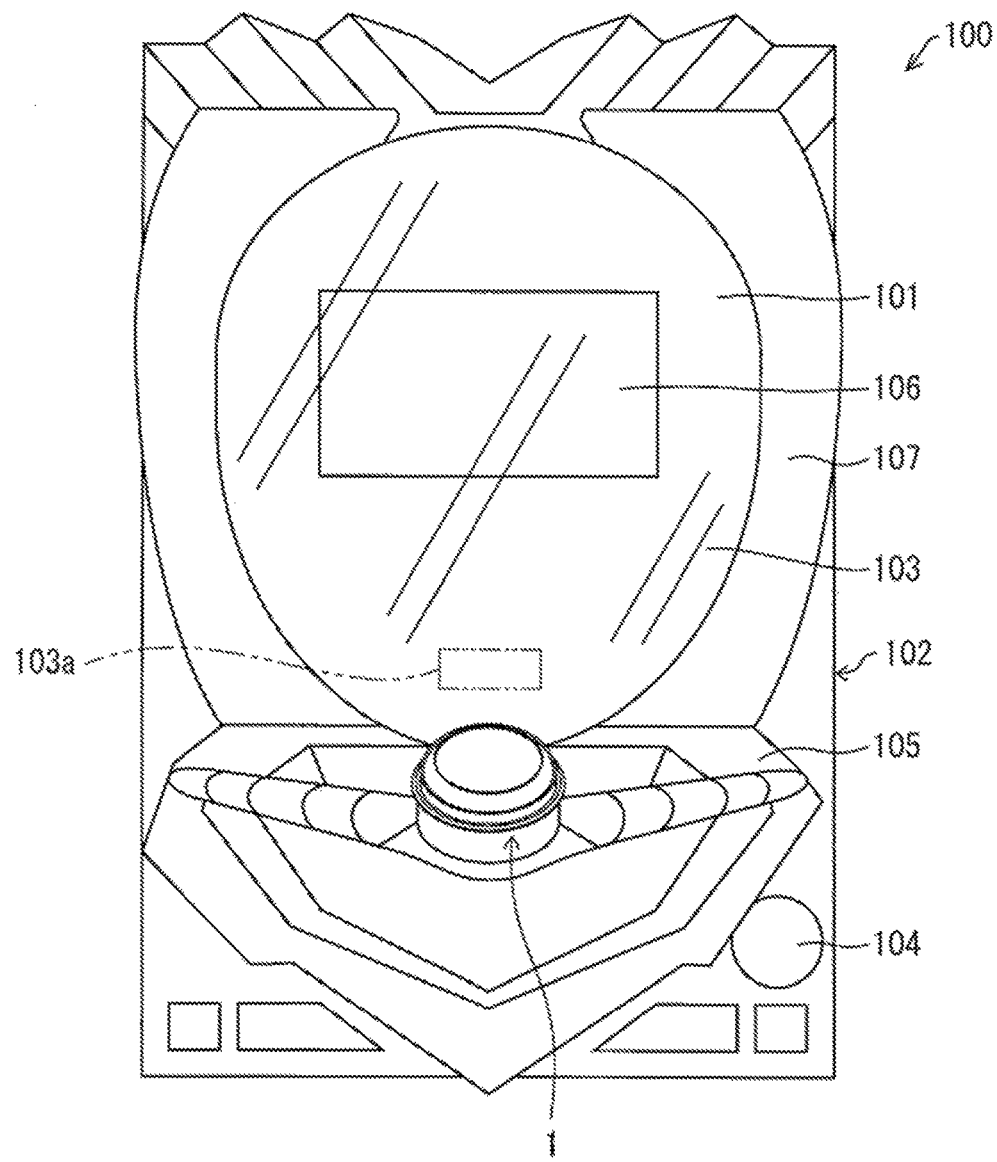
FIG. 1 is a schematic front view of a pachinko machine with a button device according to a first embodiment installed therein.

First, a pachinko machine 100 provided with a button device 1 according to a first embodiment installed therein is described. FIG. 1 is a schematic front view of the pachinko machine 100 with the button device 1 according to the first embodiment installed therein.

As illustrated in FIG. 1, the pachinko machine 100 is provided with a playfield 101 through which a pinball travels, and a front door 102 configured to automatically open and close in relation to the playfield 101. The front door 102 supports a transparent glass panel 103 (transparent panel) arranged on the front side of and parallel to the playfield 101 at a predetermined distance from the playfield 101. The front door 102 includes a front frame 107 arranged to surround the glass panel 103; the lower part of the front door 102 also includes an upper tray 105 to the right of which is a knob 104 that a player may use to adjust the force at which a pinball is launched while playing the game.

The play area where the pinball travels is formed between the glass panel 103 and the playfield 101. A launcher (not shown) strikes the pinballs collected in the upper tray 105 and launches the pinballs with a force corresponding to the rotation angle of the knob 104 when the player grips and rotates the knob 104 clockwise. The launched pin balls are guided by a guide component (not shown) to top of the play area, with the pinball is falling along the surface of the playfield 101 wireless course of travel changes as the pinball comes in contact with pins (not shown) and pinwheels (not shown) arranged in the play area. A plurality of start pockets, win pockets, and gates (not shown) are provided as gadgets used for prizes and wins. When a pinball enters a start port or a prize port, individual bonus balls (pinballs) according to the prize location are paid into the upper tray 105. The machine is designed so that pinballs collecting in the upper tray 105 fall into a box (not shown) below the upper tray 105.

For instance, when a pinball enters a start pocket, a special presentation effect such as for a jackpot or the like may be rendered different from an ordinary presentation effect. There may be large win pocket and small win pocket, with the large win pocket paying out the same amount as a jackpot. Releasing the large prize ports when there is a grand prize win allow the player to enjoy special play after winning a large amount of pinballs.

A display screen 106, an illumination device, a presentation effect gadget, a speaker, and the like are provided outside the play area. The illumination device is for presenting effects and decorating the playfield 101 and around the playfield 101 with light.

The display screen 106 shows, for instance, various kinds of display objects such as a decorative pattern used to notify a player of a jackpot prize, a character or item that presents a warning, a display image that shows the jackpot prize is on hold, or the like. The illumination device may emit light in accordance with the player's progress in the game, change the illumination or blinking pattern, or change the color of the light emitted thereby providing optical presentation effects. The presentation gadget creates presents effects using movement and light by, for instance, rotating or moving the gadget while causing a built-in light emitting element to emit light. The speaker provides effects from sound by outputting music or vocals or sound effects.

Additionally, the button device 1 according to this embodiment is provided near the upper tray 105. The button device 1 allows a player to manipulate a button input unit to provide interaction information. The display screen 106 shows a presentation image that prompts operation of the button device 1 such that the presentation image changes when the player operates the button device 1 according to the presentation image.

The button device 1 may also be provided with a means of providing optical presentation effects, and similarly to the illumination device may emit light in accordance with the progress of the game by the player, change the elimination illumination or blinking pattern thereof, or change the color of the light emitted.

Moreover, as is later described in detail, the button device 1 according to the embodiment also presents an effect by using light to illuminate the glass panel 103 covering the playfield 101 such that the light reflected by the glass panel 103 renders a first image visible to the player. A region 103a at the lower part of the glass panel 103 (shown with dotted lines) is irradiated with light for producing the first image.

2. Configuration of the Button Device 1

Figure 2:
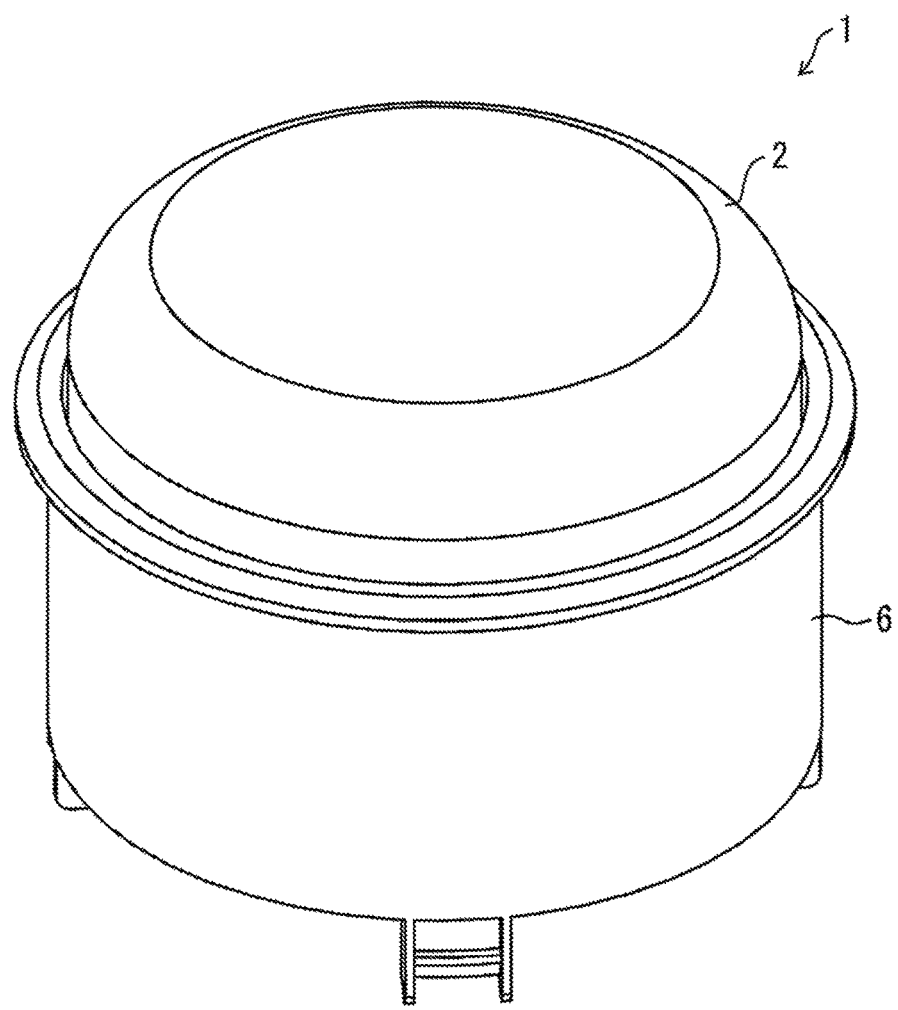
FIG. 2 is a perspective view of the external features of the button device according to the first embodiment.

First, a configuration of the button device 1 is described using FIG. 2 and FIG. 7. FIG. 2 is a perspective view of the external features of the button device 1. The button device 1 is installed on the pachinko machine 100 so that the button device moves downward when pressed. Accordingly, the direction the button device 1 is pressed is referred to as downward in the opposite direction is referred to as upward in the following description.

Figure 3A:
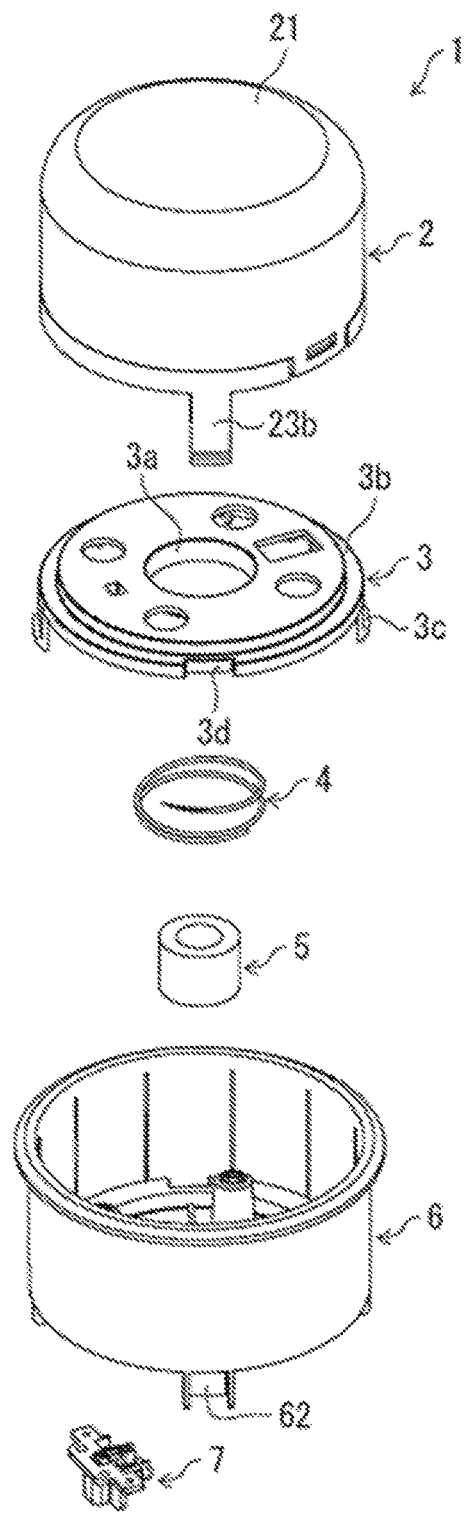
FIGS. 3A and 3B are exploded perspective views of the above button device.
Figure 3B:
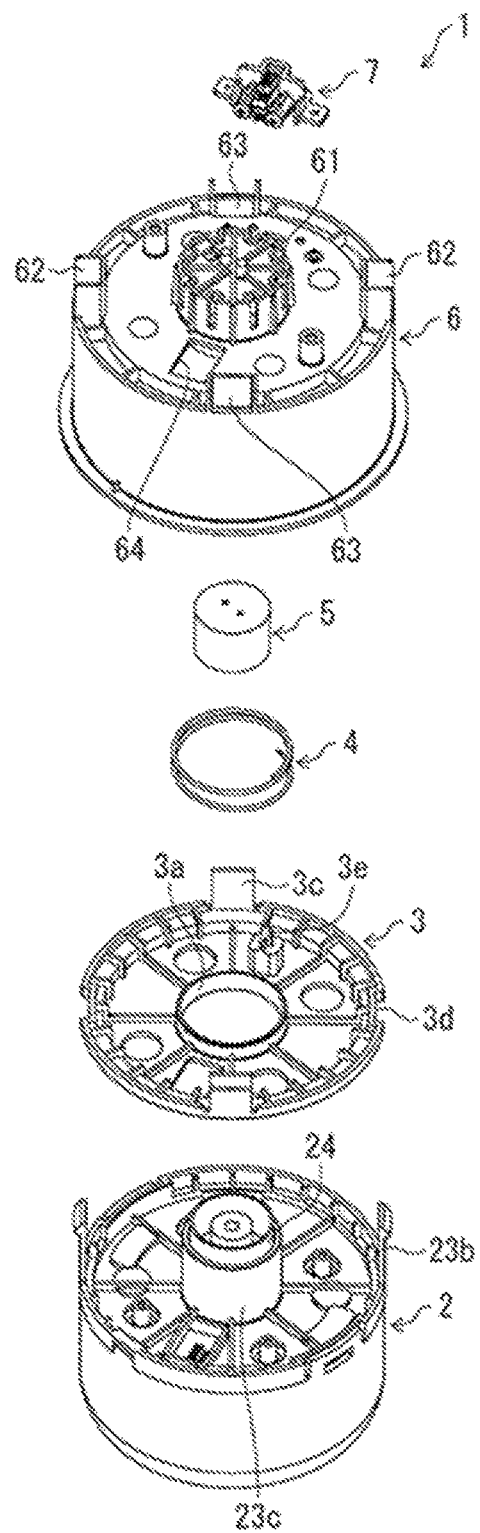
Figure 4:
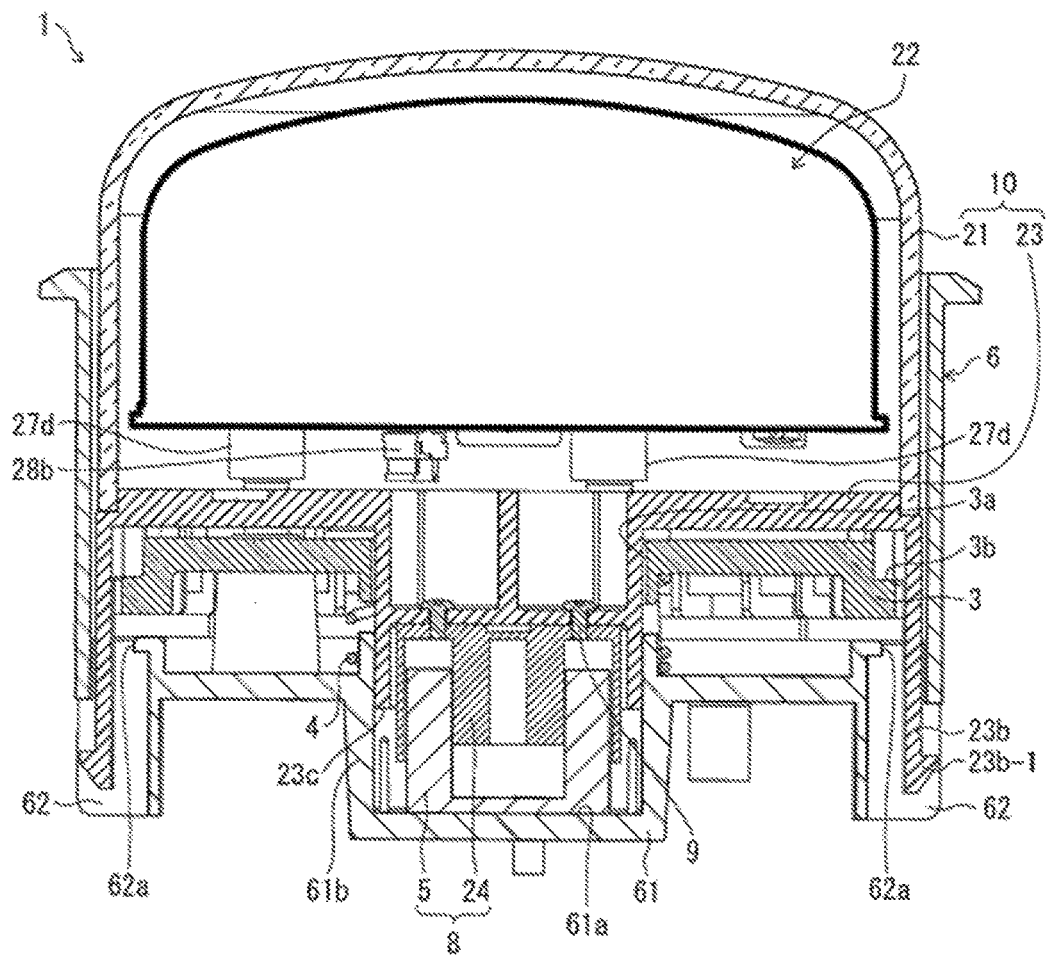
FIG. 4 is a cross-sectional view of the above button device when unoperated.
Figure 5:
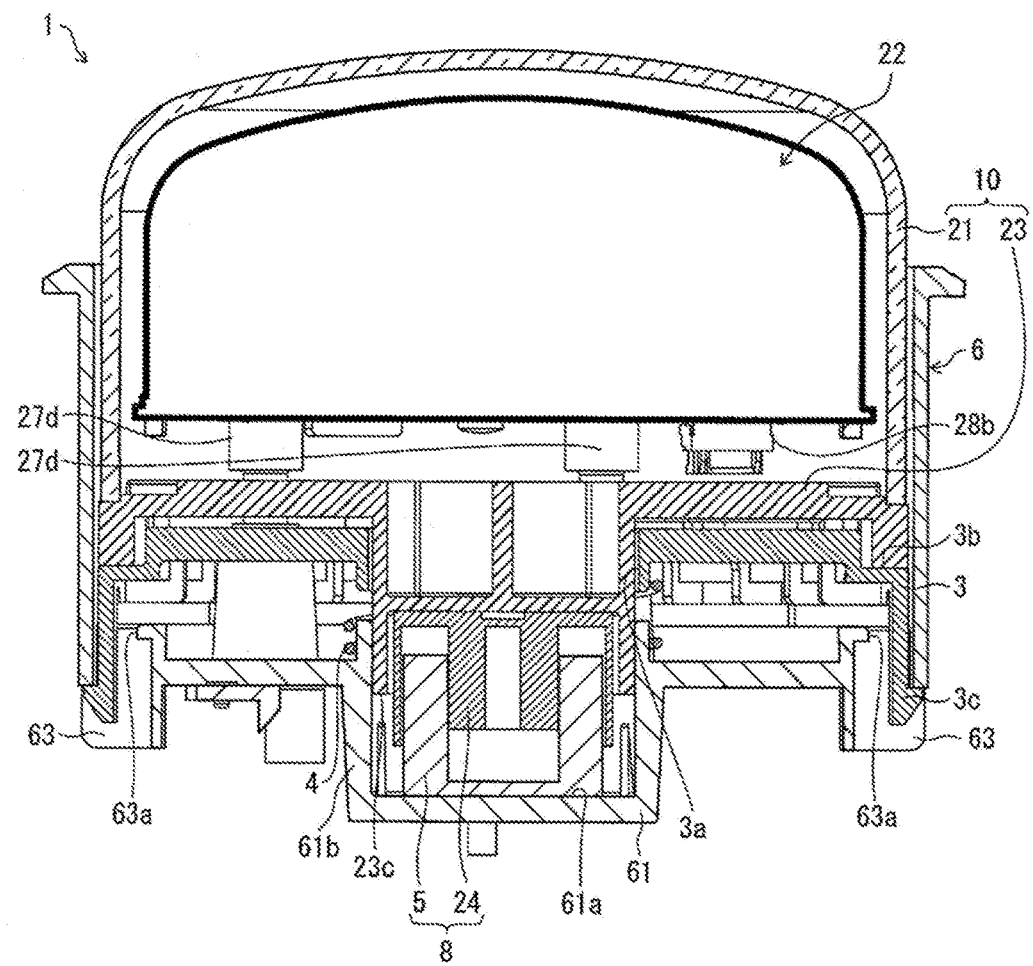
FIG. 5 is a cross-sectional view of the above button device when unoperated.
Figure 6:
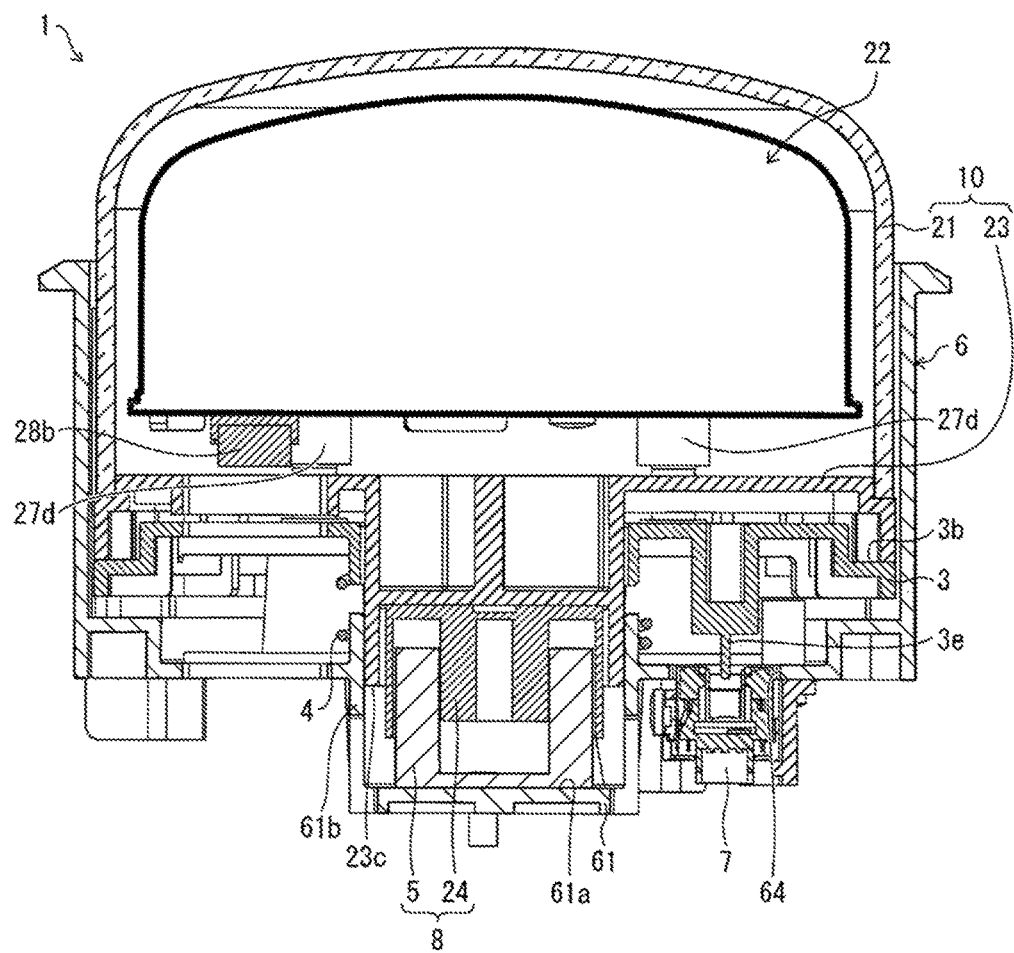
FIG. 6 is a cross-sectional view of the above button device when unoperated.
Figure 7A:
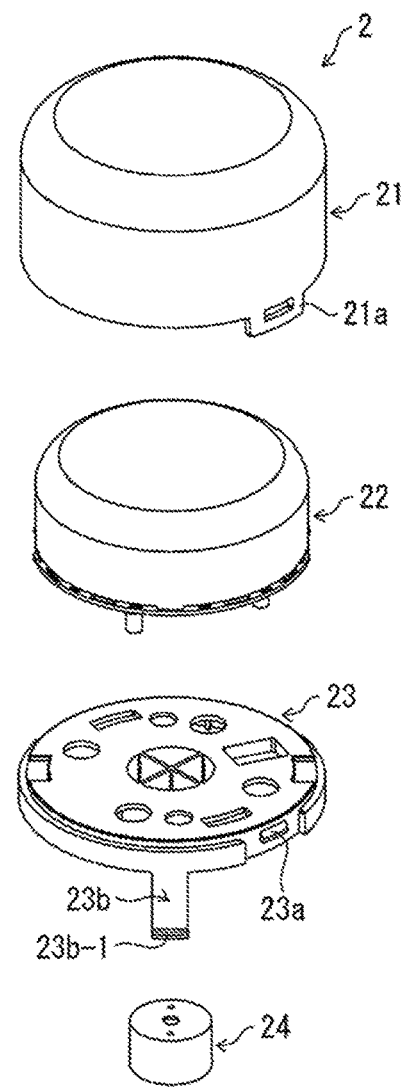
FIGS. 7A and 7B are exploded perspective views of the above button device.
Figure 7B:
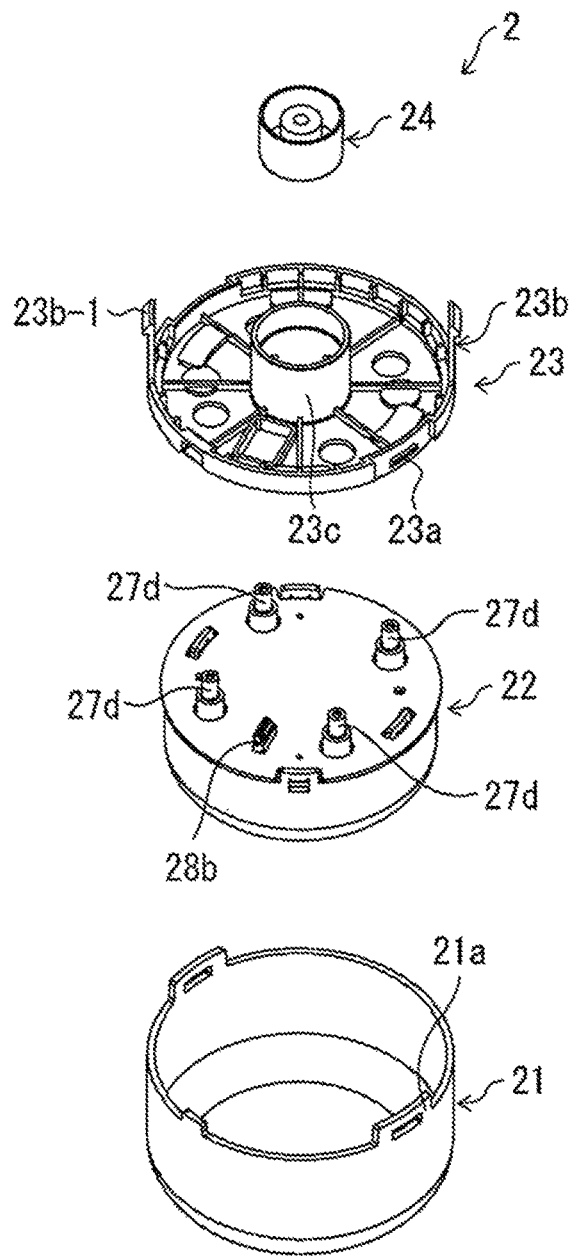

FIGS. 3A and 3B are exploded perspective views of the above button device 1; FIG. 3A is an exploded perspective view from the top and FIG. 3B is an exploded perspective view from the bottom. FIG. 4 through FIG. 6 are cross-sectional views of the button device 1 when the button device 1 is on operated, each being different cross-sections along of the operation direction (vertical direction) of the button device 1. Note that for convenience, the cross-sectional structure of the optical effect unit 22 (later described) is omitted when describing FIG. 4 through FIG. 6. FIGS. 7A and 7B are exploded perspective views of the main unit 2 of the button device 1; FIG. 7A is an exploded perspective view from the top and FIG. 7B is an exploded perspective view from the bottom.

As illustrated in FIG. 3 through FIG. 6 the button device 1 is provided with a main unit 2 (button unit), a lower guide 3 (support unit), a return spring 4 (bias element), a fixed voice coil element 5, a case 6, and a sensor 7.

The case 6 is a closed roughly circular cylinder that holds each component of the button device 1 and may be connected to the various devices such as the game machine that is provided with the button device 1. The case 6 is provided with the voice coil motor holder 61, and upper guide stopper 62, a lower guide stopper 63 and a sensor-mounting window 64.

The voice coil motor holder 61 is provided at the center of the bottom of the case 6, made up of a bottom surface 61a and a roughly cylindrical wall 61b.

The upper guide stopper 62 is formed to protrude downward from the periphery of the bottom surface of the case 6 at two opposite locations thereat. The upper guide stopper 62 includes a hole 62a.

The lower guide stopper 63 is formed to protrude downward from the periphery of the bottom surface of the case 6 at two opposite locations thereat, in the same manner as the upper guide stopper 62. The lower guide stopper 63 includes a hole 63a.

The sensor-mounting window 64 is formed on the bottom surface of the case 6 for mounting a sensor 7.

The sensor 7 is secured to the sensor-mounting window 64 in the case 6 with a screw or the like. The sensor 7 is a photo interrupter that includes a light emitting unit (not shown) and a light receiving unit (not shown) and senses an object entering or exiting the object detection space that lies between the light emitting unit and the light receiving unit. The sensor 7 transmits an on or off signal to a controller (not shown) provided to the button device 1 for the presence or absence of an object respectively in the object detection space.

The fixed voice coil element 5 (fixed element) is placed inside the voice coil motor holder 61 in the case 6 and is secured to the bottom surface 61a of the voice coil motor holder 61 with a screw or the like. The fixed voice coil element 5 corresponds to the moving element in the voice coil motor and is provided with a cylindrical coil. Thus, the button device 1 according to this embodiment simplifies wiring by securing the portion provided with the coil, which requires the passage of electric current, and thereby further simplifies the configuration of the button device 1. The fixed voice coil element 5 is integrated with the later described movable voice coil element 24 (moving element) provided to the main unit 2, and serves as the voice coil motor 8 (drive unit).

The return spring 4 is a coil spring. The return spring 4 resides at the upper part in the center of the bottom surface of the case 6 so that the voice coil motor 8 can be housed inside. One end of the return spring 4 abuts the case 6 and the other end abuts the lower guide 3. In the state illustrated in FIG. 4, the return spring 4 is compressed beyond its natural length due to the weight of the cover 21 of the main unit 2, an upper guide 23 and the movable voice coil element 24, as well as the lower guide 3. Therefore, the return spring 4 biases the cover 21 of the main unit 2, the upper guide 23 and the movable voice coil element 24 as well as the lower guide 3 upward when the button device is unoperated.

The lower guide 3 is a substantially circular disk with a hole 3a formed in the center portion, and supports the input element 10 provided to the main unit 2 when the button device 1 is operated. The lower guide 3 includes a stepped portion 3b formed on the periphery, a pair of locking parts 3c extending downward from the stepped portion 3b with the tip end protruding outward, and a light shielding part 3e provided above the object detection space in the sensor 7. The stepped portion 3b abuts the cover 21 of the main unit 2 so that the lower guide 3 supports the cover 21. The locking parts 3c are disposed so that the lower guide 3 inserts into the hole 63a in the lower guide stopper 63 in the case 6.

When the button devices unoperated (when the input element 10 is at the base position) the return spring 4 biases the lower guide 3 upward so that the locking parts 3c are anchored in lower end surface of the lower guide stopper 63 in a first position and this engagement prevents upward movement of the lower guide 3. When the button device 1 is operated, the lower guide to 3 moves to a second position that comes in contact with the lower end of the case 6, limiting the upward movement of the lower guide 3 during operation of the button device 1. A notch 3d is formed in the stepped portion 3b of the lower guide 3 corresponding to the position of the upper guide stopper 62 on the case 6. Note that there is a predetermined gap (clearance) between the lower guide 3 and the case 6 in a direction orthogonal to the direction the button is pressed.

As illustrated in FIG. 7, the main unit 2 is equipped with an input element 10 configured integrally with the cover 21 and the upper guide 23 (FIG. 4), the optical effect unit 22, and the movable voice coil element 24.

The input element 10 is configured integrally with the cover 21 and the upper guide 23 to move downward in accordance with the push action by a player. The input element 10 is provided with the cover 21 and the upper guide 23. Note that there is a predetermined gap (clearance)

between the input element 10 and the case 6 in a direction orthogonal to the direction the button is pressed.

The cover 21 is a capped substantially circular cylinder with the optical effect unit 22 disposed in the hollow portion thereof. The cover 21 also includes a pair of engagement holes 21a at opposing locations and lower periphery of the cover 21.

The optical effect unit 22 provides optical presentation effects; as is later described in detail, the bottom surface of the optical effect unit includes a protruding portion 27d for securing the optical effect unit 22 to the case 6 with a screw or the like, and a connector 28b or the like via which electricity or control signals enter.

The upper guide 23, is disposed at the lower end of the optical effect unit 22 and is for guiding the movement of the cover 21. The upper guide 23 is a substantially circular disk and is provided with an engagement hook 23a, a hanging portion 23b, a voice coil motor holder 23c (protruding portion).

The engagement 23a is formed on the periphery of the upper guide 23 at a location corresponding to the engagement holes 21a in the cover 21, and engages with the engagement holes 21a in the cover 21. Hereby, the upper guide 23 and the cover 21 are combined into a single component while holding optical effect unit 22 therebetween.

A hanging portion 23b is formed at two opposing locations on the periphery to extend downward. The hanging portion 23b is also formed at a location corresponding to the notch 3d in the lower guide 3 and the upper guide stopper 62 in the case 6 and includes a locking part 23b-1 at the lower end thereof.

The voice coil motor holder 23c is formed in the center of the button device 1 protruding downward as a cylinder that is open at the lower end. The movable voice coil element 24 is placed inside the voice coil motor holder 23c. The voice coil motor holder 23c passes through the hole 3a in the lower guide 3, and is able to slide in the voice coil motor holder 61 in the case 6 in contact with the wall 61b of the voice coil motor voter 61

The movable voice coil element 24 is placed inside the voice coil motor holder 23c inside the upper guide 23 and is secured to the voice coil motor holder 23c with the screw 9 (FIG. 4). Therefore, the movable voice coil element 24 moves integrally with the input element 10. The movable voice coil element 24 corresponds to the fixed element in the voice coil motor 8 and is provided with a permanent magnet and yoke.

3. Operation of the Button Device 1

Figure 8:
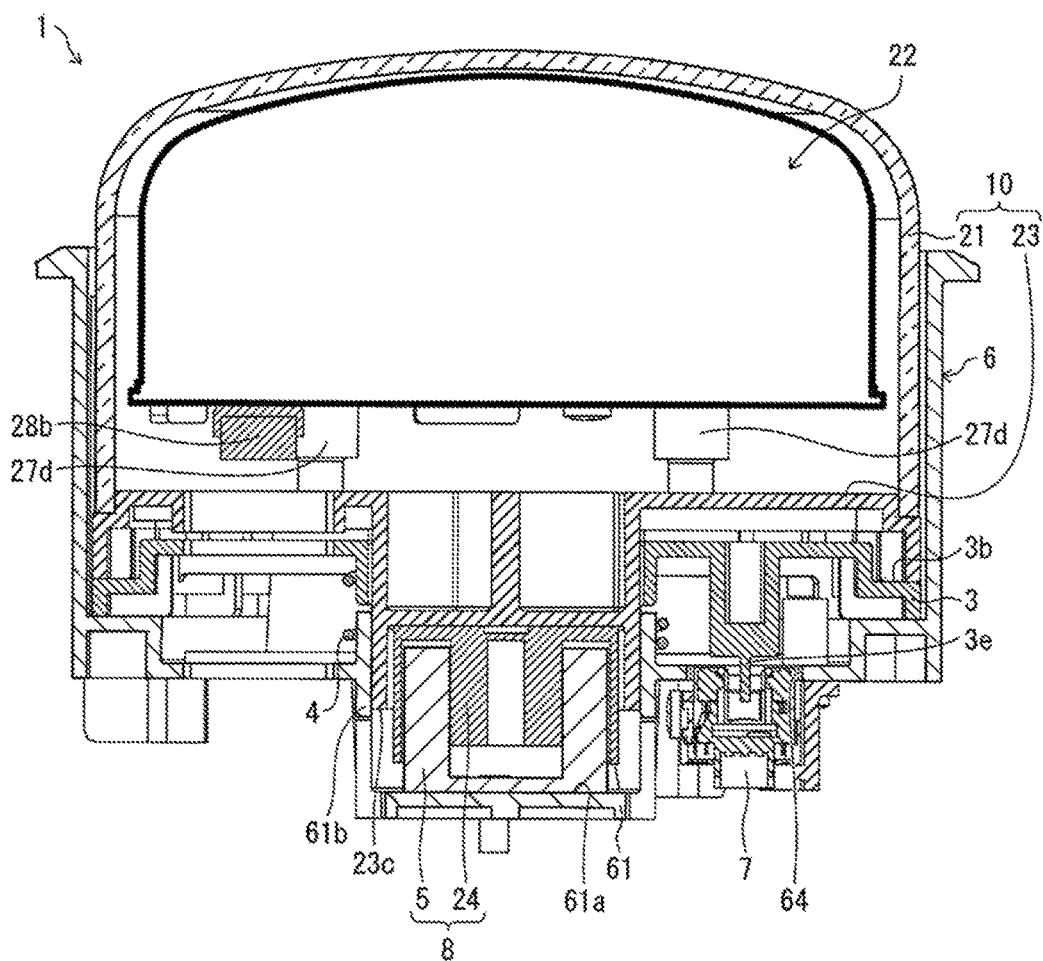
FIG. 8 is a cross-sectional view of the above button device when operated.
Figure 9:
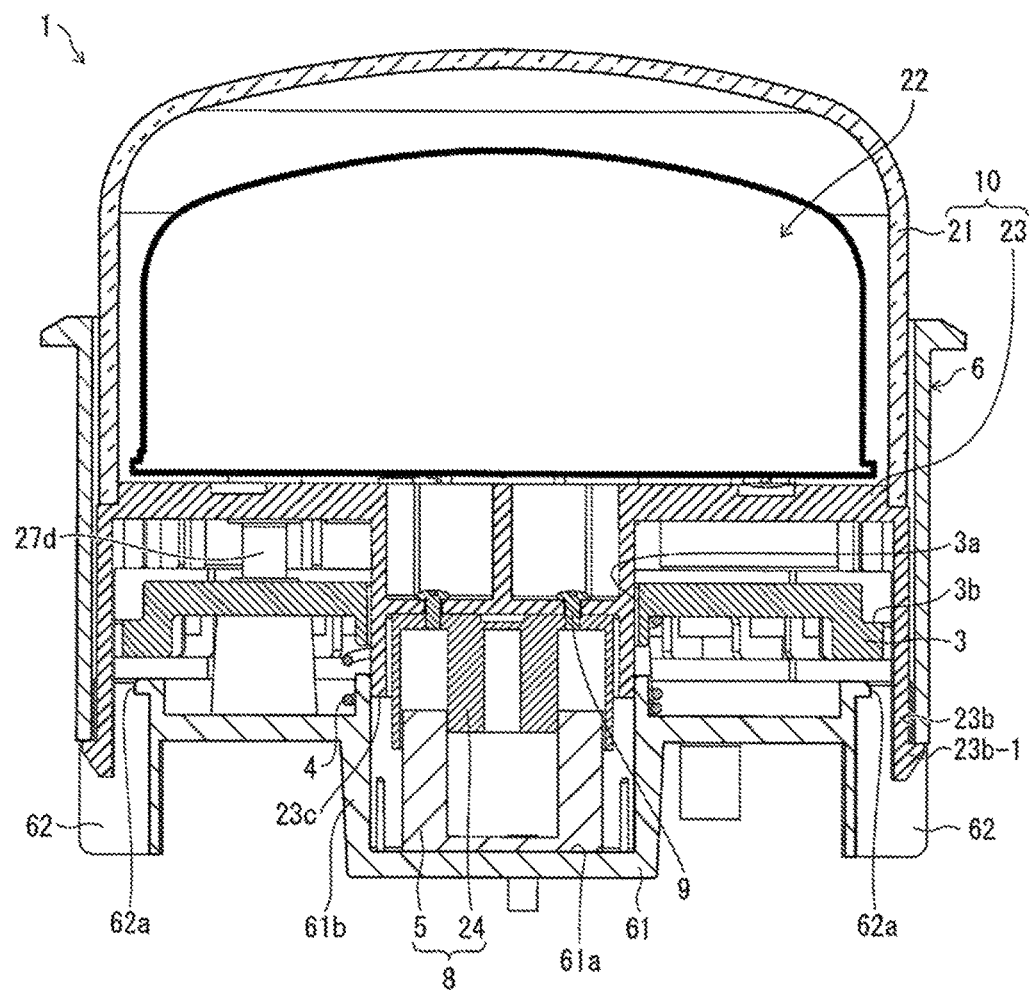
FIG. 9 is a cross-sectional view of the above button device when the voice coil motor is driven.

Next, the operation of the button device 1 is described using FIG. 8 and FIG. 9. FIG. 8 is a cross-sectional view of the button device 1 when operated, and corresponds to the cross-section of FIG. 6.

In the states illustrated in FIG. 6, the input element 10 is at a base position where the button device is unoperated and the lower guide 3 is in a first position. When an operator pushes the button and pressure is applied to the cover 21, the input element 10 (i.e., the cover 21 and the upper guide 23 locked into the cover 21) which is at the base position, the lower guide 3 in contact with the upper guide 23, and the movable voice coil element 24 move downward. The return spring 4 is thus compressed, and the lower guide 3 moves to a second position where the light shielding part 3e enters the object detection space of the sensor 7 and placing the button device 1 in the on state.

At this point, the voice coil motor holder 23c in the upper guide 23 slides relative to the wall 61b of the voice coil motor holder 61 in the case 6 to guide the movement of the cover 21. In other words, the wall 61b guides the movement of the input element 10 when the button device 1 is operated.

A button device may be configured so that the outer portion of the cover slides when the button device is pressed; such a button device may not activate if the cover tilts while the outer portion of the cover is pressed. Additionally, when the cover is tilted the cover pulls on the case impeding movement of the cover, which is problematic.

In contrast, it is the center portion of the button device 1 that slides when the button device 1 is operated (i.e., when the input element 10 moves). Therefore, even with pressure on the outer portion of the cover 21, the upper guide 23, which slides in the center of the button device 1, guides the cover 21, and the cover 21 and upper guide 23 move downward in a substantially horizontal fashion. Hereby, lower guide 3 also moves downward in a substantially horizontal fashion. This structure therefore facilitates rendering the button device 1 in the on state regardless of the portion of the cover 21 pressed; and the cover 21, which moves downward while horizontal improves the sliding motion and the operability of the device.

When the button device 1 is no longer pressed, the bias of the return spring 4 causes the cover 21, the upper guide 23, the movable voice coil element 24, and the lower guide 3 to return to the on operated position, thereby returning the button device 1 to the state illustrated in FIG. 6. At this point, the locking parts 3c in the lower guide 3 engage with the case 6 and are at a first position, which therefore causes the input element 10 to return to the base position.

FIG. 9 is a cross-sectional view of the button device 1 when the voice coil motor 8 is driven (operating); and corresponds to the cross-sectional view in FIG. 4.

A magnetic force causes the movable voice coil element 24 to move away from the fixed voice coil element 5 (i.e., moves upward) when the fixed voice coil element 5 in the voice coil motor 8 applies an electrical current of a predetermined direction to the coil. Consequently, the input element 10 (i.e., the upper guide 23 and cover 21), which are secured to the movable voice coil element 24 move upward (to a protruding position) with the movable voice coil element 24. At this point, the upward displacement of the upper guide 23, the movable voice coil element 24 moving integrally with the upper guide 23, and the cover 21 is restricted because the locking part 23b-1 of the hanging portion 23b on the upper guide 23 is locked into the upper guide stopper 62 of the case 6 as illustrated in FIG. 8.

Additionally, the movable voice coil element 24 moves from the protruding position and returns an unoperated state (base position) illustrated in FIG. 4 from its own weight and the weight of the input element 10 once a current is no longer applied to the voice coil motor 8.

When the button device is unoperated, applying a current to the voice coil motor 8 in the direction opposite the above described direction causes the movable voice coil element 24 to move downward due the magnetic force to the state illustrated in FIG. 9. Therefore, the light shielding part 3e on the lower guide 3, which moves together with the movable voice coil element 24, enters the object detection space of the sensor 7 and turns on the button device 1.

The movable voice coil element 24 returns to the unoperated state (FIG. 6) due to the biasing of the return spring 4 when a current is no longer applied to the voice coil motor 8.

Thus, the cover 21 can be configured to move vertically when an electric current is supplied to the voice coil motor 8, providing the button device 1 with highly effective visuals.

The cover 21 may be moved vertically by, for instance: using the voice coil motor 8 to move the cover 21 upward, and having the cover 21 return to an unoperated positive due to its own weight; or, using the voice coil motor 8 to move the cover 21 upward, and reversing the direction of the current passing through the voice coil motor 8 to move the cover 21 downward. Further, on the other hand, the voice coil motor 8 may be used to move the cover 21 downward, whereafter the biasing of the return spring 4, or the reversing the direction of the current supplied to the voice coil motor 8 moves the cover 21 upward.

Finally, the cover 21 may be moved vertically in small intervals by pulsing a current through the voice coil motor 8, thereby causing the button device 1 to vibrate. Any desired method may be used to cause the button device 1 to vibrate, for instance, by modifying the current supplied to the voice coil motor 8 (e.g., the pulse width, or the like).

The optical effect unit 22 may provide optical presentation effects while the sensor 7 outputs an ON signal. This configuration allows the emission of light from the button device 1 to coincide with the vertical movement of the cover 21 and thus achieve highly effective visuals.

Thus, when the button device 1 is operated, the voice coil motor holder 23c in the upper guide 23, which is provided to the input element 10 that is at the center of the button device 1 slides relative to the wall 61b of the voice coil motor holder 61 in the case 6. The voice coil motor 8 is disposed inward of the sliding of the voice coil motor holder 23c and the wall 61b.

Therefore, in addition to improving operability of the button device, the input element 10 may provide effects such as moving or vibrating vertically due to the operation of the voice coil motor 8, thereby the button device 1 can provide highly effective visuals.

Using the voice coil motor 8 to implement the vertical movement and vibration of the input element 10 removes the need to provide this movement via mechanical means mechanism such as gears as is the case with existing button devices; therefore the button device 1 may be simply configured, and can be compact.

Moreover, using the magnetic force of the voice coil motor 8 to implement the vertical movement and the vibration of the input element 10 thus reduces the likelihood that the button device 1 will be damaged if the button operator presses the button device 1 while the input element 10 is moving vertically or is vibrating. Because the input element 10 moves due to a magnetic force, the input element 10 can be moved vertically or made to vibrate quickly compared to using a mechanical mechanism that requires a mechanical force. Hereby, the button device 1 not only moves vertically but can also can provide a vibration effect, and thus provide a player with highly effective visuals.

4. Configuration of the Optical Effect Unit 22

Figure 10:
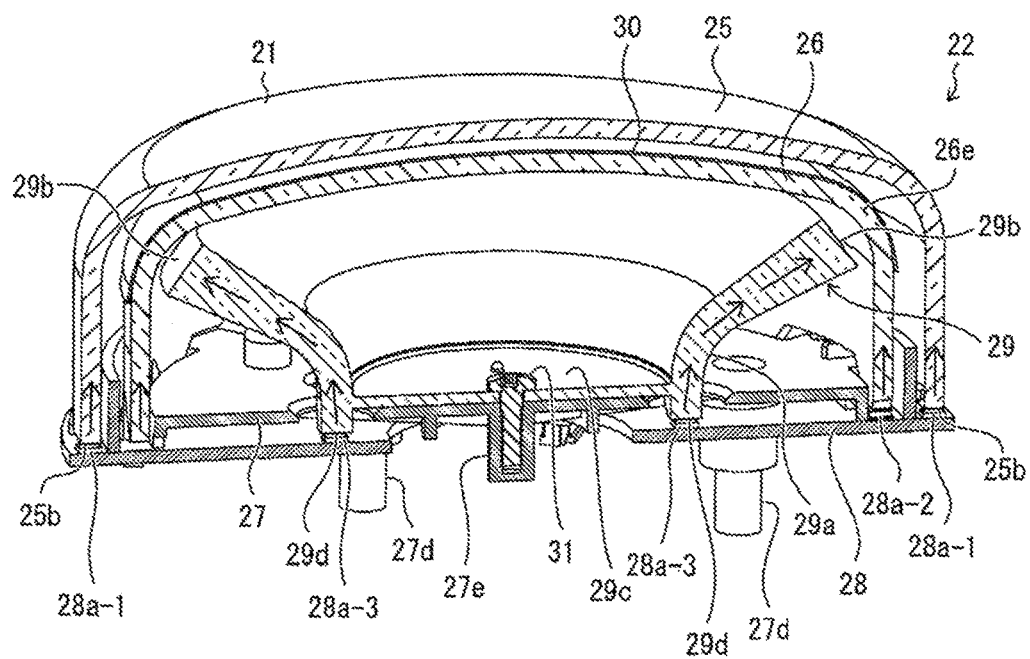
FIG. 10 is a cross-sectional perspective view of an optical effect unit provided in the above button device.
Figure 11A:
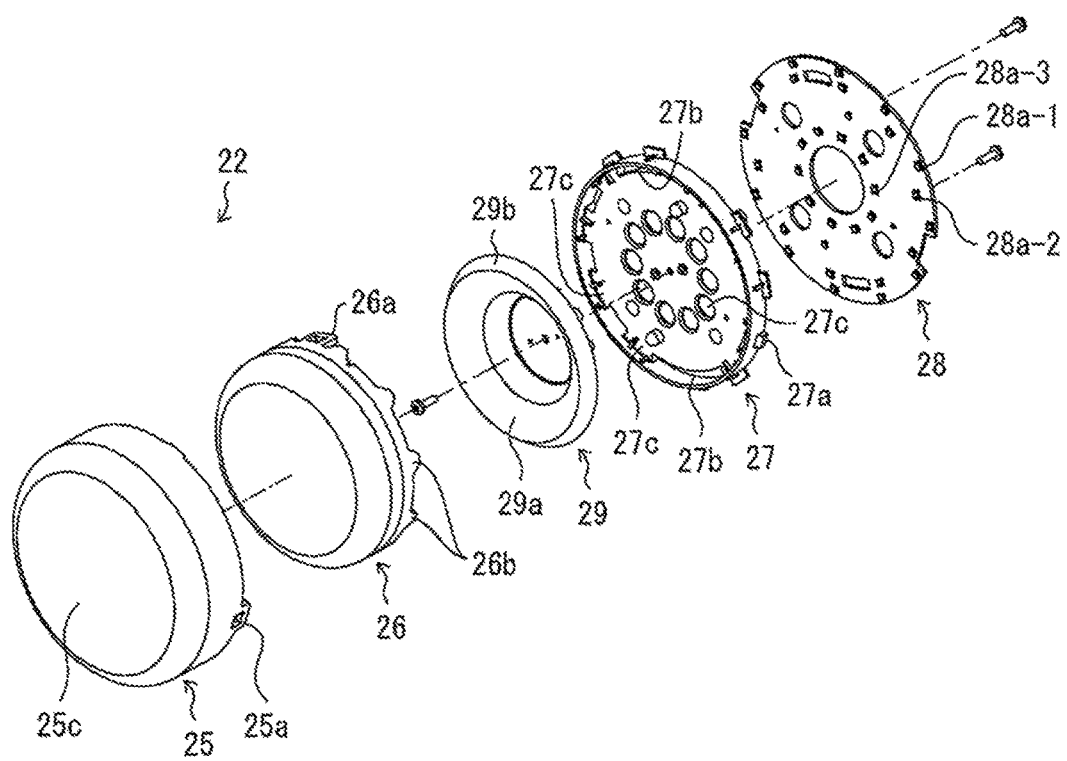
FIGS. 11A and 11B are exploded perspective views of the above optical effect unit.
Figure 11B:
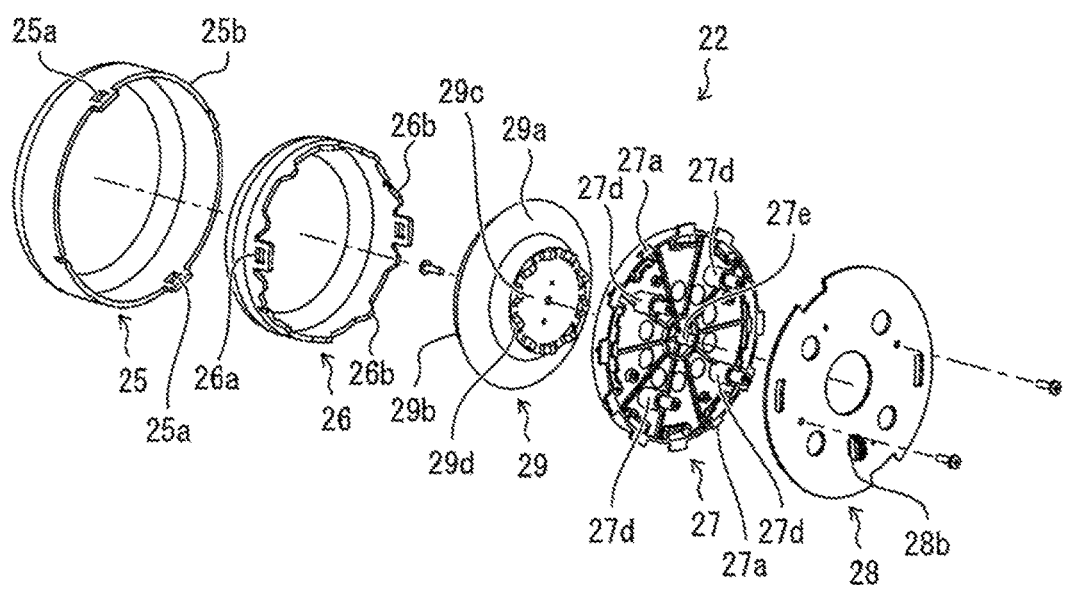
Figure 12:
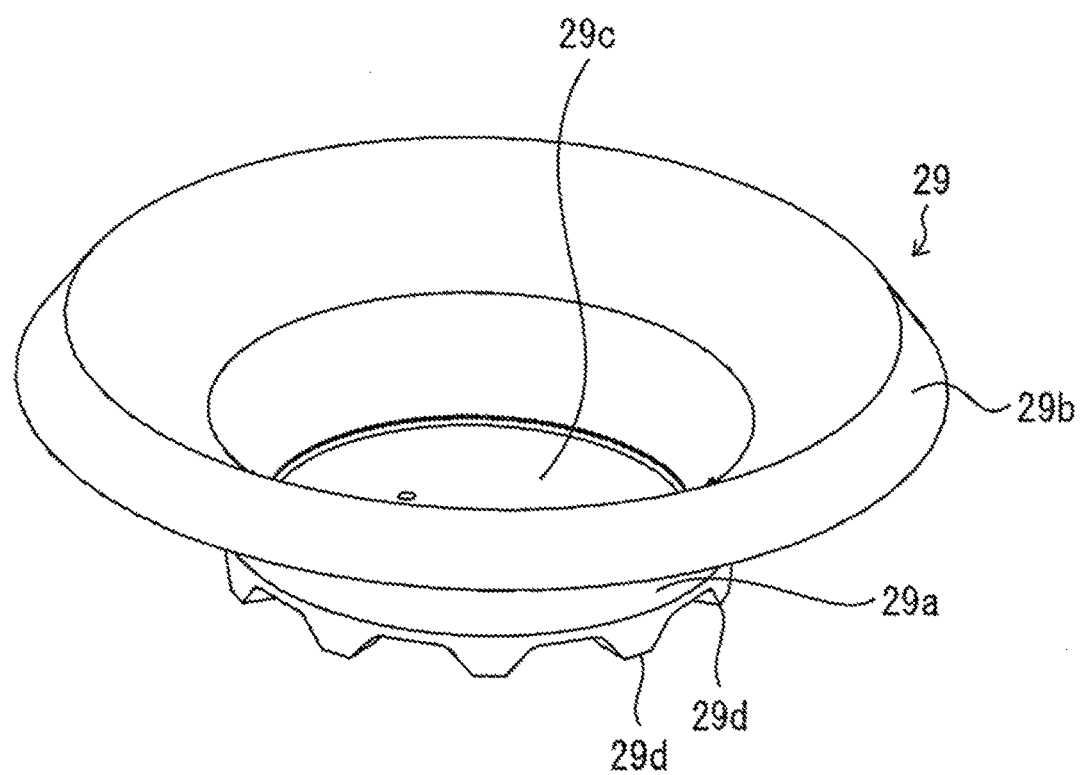
FIG. 12 is a perspective view of a light guiding lens provided in the above optical effect unit.
Figure 13:
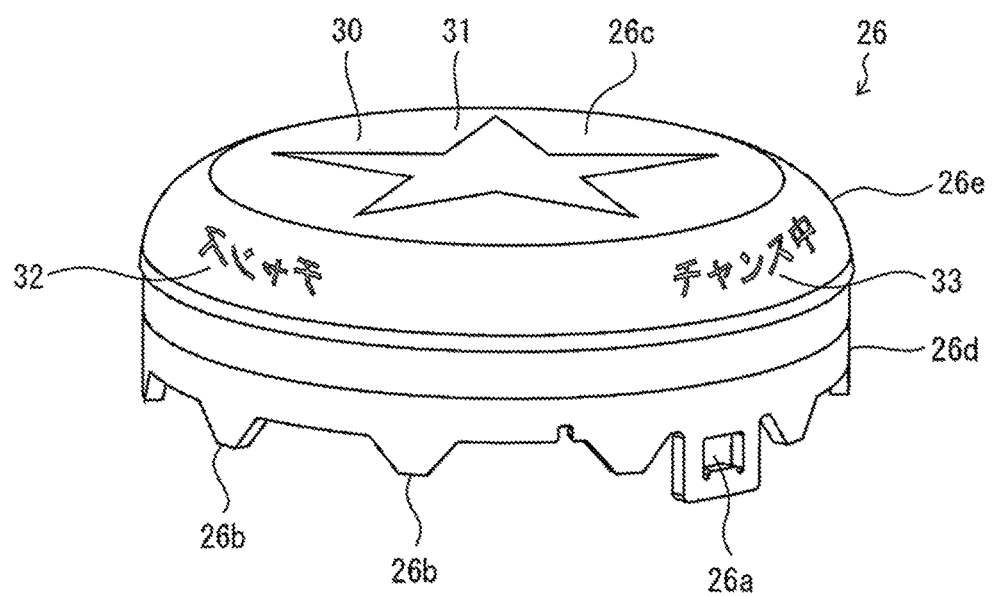
FIG. 13 is a perspective view of an inner lens having a printed sheet integrated therewith provided in the above optical effect unit.

Next, the operation of the optical effect unit 22 is described using FIG. 10 through FIG. 13. FIG. 10 is a cross-sectional perspective view of the optical effect unit 22 provided in the button device 1, and is a view of the section along the operation direction (vertical direction) of the button device 1. FIGS. 11A and 11B are exploded perspective views of the optical effect unit 22; FIG. 11A is an exploded perspective view from the top and FIG. 11B is an exploded perspective view from the bottom. FIG. 12 is a perspective view of a light guiding lens 29 provided in the above optical effect unit 22; and FIG. 13 is a perspective view of an inner lens 26 having a printed sheet 30 integrated therewith provided in the optical effect unit 22.

As illustrated in FIG. 10, and FIGS. 11A and 11B, the optical effect unit 22 is provided with an outer lens 25, an inner lens 26 (transparent support), a light guiding lens 29, a printed sheet 30, a base unit 27, and a substrate 28.

The substrate 28 is a printed circuit board provided with a plurality of full-color LED elements 28a distributed concentrically about circles of different diameters. The full-color LED elements 28a-1, which are distributed along the outermost circle, emit light that is guided to the outer lens 25; the full-color LED elements 28a-2, which are distributed on the second inner circle, emit light that is guided to the inner lens 26. Finally, the full-color LED elements 28a-3, which are distributed along the innermost circle, emit light that is guided to the light guiding lens 29.

A connector 28b is provided on the surface opposite the surface on which the full-color LED elements 28a are mounted. The substrate 28 is connected to the controller (not shown) of the pachinko machine 100 equipped with the button device 1 via the connector 28b, and causes the full-color LED elements 28a to emit light on the basis of signals from said controller.

The base unit 27 supports each component in the optical effect unit 22. The substrate 28 is secured underneath the bottom of base unit 27 via a screw or the like. The base unit 27 is made up of an outer locking hook 27a, an inner locking hook 27b, a hole 27c, a protruding portion 27d, and a lens fitting 27e. An outer locking hook 27a is formed at two locations outside the periphery at the lower part of the base unit 27. And inner locking hook 27b is formed at two locations inside the periphery at the lower part of the base unit 27. The lens fitting 27e protrudes from the bottom surface of base unit 27.

The hole 27c is formed in the bottom part of the base unit 27, and corresponds to the full-color LED elements 28a-3 on the substrate 28 and the locations of the full-color LED elements 28a-3 when the substrate 28 is secured to the base unit 27.

The cylindrical protruding portion 27d is provided protruding from the lower part of the base unit 27 to secure the base unit 27 to the case 6 (FIG. 4). The substrate 28, the upper guide 23, and the lower guide 3 are each provided with a whole corresponded to the protruding portion 27d; therefore, the protruding portion 27d, inserted in the corresponding holes, is in contact with the case 6. A screw or the like secures the protruding portion 27d and the case 6 together to secure the base unit 27 to the case 6.

The light guiding lens 29 is made from photo conductive material that allows light entering from one end to travel therethrough and exit from the other end. As illustrated in FIG. 12, the light guiding lens 29 includes an upper part (near the inner lens 26), a lower part (near the base unit 27), and a bowl like trunk 29a that is wider than the upper part and the lower part; the trunk 29a includes an output surface 29b formed at the upper edge thereof. The output surface 29b slopes so that the outer edge is lower than the inner edge. Hereby, light exiting from the output surface 29b continues diagonally upward in the direction of a normal to the output surface 29b.

A screw or the like fixes light guiding lens 29 to the lens fitting 27e on the base unit 27 with the bottom part 29c of the light guiding lens 29 in contact with the center of the bottom part of the base unit 27; the light guiding lens 29 is thereby secured to the base unit 27 A plurality of protruding portions 29d are provided on the underside of the bottom part 29c of the light guiding lens 29 surrounding the periphery of the bottom part 29c; the protruding portions 29d pass through the hole 27c and are located in front of the innermost full-color LED elements 28a-3 when the light guiding lens 29 is secured to the base unit 27. The protruding portions 29d guide more of the light from the full-color LED elements 28a-3 into the light guiding lens 29 where the light propagates and exists from the output surface 29b.

Returning to FIG. 10, and FIGS. 11A and 11B, the inner lens 26 is a light guiding component resembling an inverted cup and is disposed above the base unit 27 to cover the light guiding lens 29. The inner lens 26 includes an engagement hole 26a at a position corresponding to the inner locking hook 27b of the base unit 27. The inner locking hook 27b of the base unit 27 engages with the engagement hole 26a to secure the inner lens 26 to the base unit 27.

As illustrated in FIG. 13, the inner lens 26 is integrated with a printed sheet 30 that holds a decorative image 31. A plurality of protruding portions 26b are formed at the lower end part (lower edge) of the inner lens 26; the protruding portions pass through the hole 27c and are located in front of the second ring of full-color LED elements 28a-2 when the inner lens 26 is secured to the base unit 27. The protruding portions 26b guide more of the light from the full-color LED elements 28a-2 into the inner lens 26 to show the decorative image 31 held on the printed sheet 30.

The printed sheet 30 retains the decorative image 31 in an area corresponding to the top surface 26c of the inner lens 26, and retains a projection image 32 for producing the first image and a second image 33 at a curved portion 26e that is rounded from the top surface 26c to the trunk 26d of the inner lens 26.

As above described, when the light from the full-color LED elements 28a-2 enters and illuminates the entire inner lens 26 the decorative image 31 produces an image directly perceivable by the player on the top surface 26c of the inner lens 26.

The projection image 32 produces a first image that is perceivable by the player. and produces the first image when light exiting the light guiding lens 29 is reflected by the glass panel 103. The second image 33 produces an image directly perceivable by the player by way of light exiting from the light guiding lens 29.

The decorative image 31, the projection image 32, and the second image are printed on the printed sheet 30. The directly perceivable decorative image 31 and second image are different images, and the projection image 32 may be perceived when the projection image 32 appears in the glass panel 103. Accordingly, only the projection image 32 is a flip mirror image of the first image where left and right are reverse, so that if characters in the first image become mirrored characters, and for patterns the left and right of the pattern is reversed. The projection image 32 is positioned oriented toward the glass panel 103 with the button device 1 is attached to the pachinko machine 100. At this point, in order for the characters or patterns in the first image to stand out, the characters or patterns portions may be made transparent and the area surrounding the project made nontransparent, i.e., of outlined type. Here, the first image shows the Japanese lettering "チャンス"; FIG. 13 depicts an example of the projection image 32, which is the mirror image for the lettering "チャンス".

The printed sheet 30 integrally formed with the inner lens 26 make up the transparent support (image holder); the transparent support, the light guiding lens 29, and the innermost full-color LED elements 28a-3 serve as a projection part that radiates light toward the direction of the playfield 101 and projects the first image in an area within the visual field of a player that can see the playfield 101. More specifically, the aforementioned projection part is configured to illuminate the glass panel 103 with light that is reflected by the glass panel 103 thus rendering the first image visible to the player.

The second image 33 can be formed anywhere on the printed sheet except at the positions where the projection image 32 is oriented toward the glass panel 103 when the button device 1 is mounted to the pachinko machine 100. In order for the characters or patterns in the second image 33 to stand out, the character or pattern portions may be made transparent and the area surrounding the project made nontransparent, i.e., of outlined type, similar to the projection image 32. FIG. 13 depicts an example of the Japanese lettering of the second image 33, namely, "チャンス!!". This embodiment includes three images serve as a second image 33; namely, an image oriented toward the player of the pachinko machine 100, and images oriented toward the left and the right of the pachinko machine 100.

A more preferable configuration of the button device 1 in the embodiment would be to reduce the visibility of non-illuminating light from the light guiding lens 29 by printing the projection image 32 and the second image 33 in half tones.

The printed sheet 30 which is integrally formed with the inner lens 26 may be produced by, for example silk screen printing the decorative image 31, the projection image 32, and the second image 33 on the printed sheet 30 and placing the printed sheets 30 in an insertion mold for processing.

Returning to FIG. 10, and FIGS. 11A and 11B, the outer lens 25 is a light guiding component resembling an inverted cup and is disposed above the base unit 27 to cover the inner lens 26. The outer lens 25 may include a light diffusing pattern of fine ridges and bumps on the front surface, the under surface or both surfaces of the top surface 25c to provide a presentation image (not shown) oriented toward the player. The outer lens 25 includes an engagement hole 25a at a position corresponding to the outer locking hook 27a of the base unit 27. The outer locking hook 27a of the base unit 27 engages with the engagement hole 25a to secure the outer lens 25 to the base unit 27.

The lower end part 25b of the outer lens 25 is located in front of the outermost full-color LED elements 28a-1 on the substrate 28 when the vertical wall of the base unit 27 is located on the outside thereof with the outer lens 25 secured to the base unit 27. Light from the full-color LED elements 28a-1 entering the outer lens 25 from the lower end part 25b is output from the light diffusing pattern and appears as the presentation image directly perceivable by the player. Note that the phenomenon that allows a presentation image produced by the light diffusing pattern to be visible is described in the second embodiment.

5. Production of Presentation Effects by the Optical Effect Unit 22

Figure 14A:
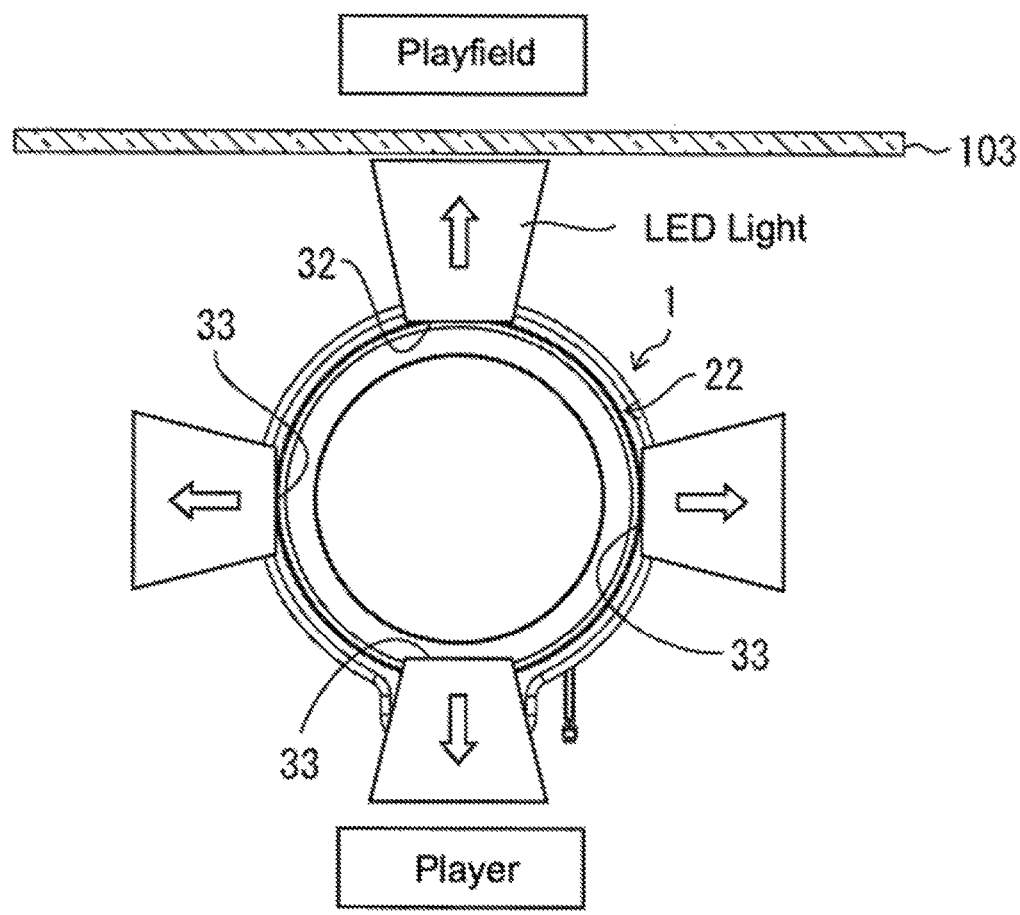
FIGS. 14A and 14B are for describing the presentation effects produced by the above optical effect unit provided to the button device.
Figure 14B:
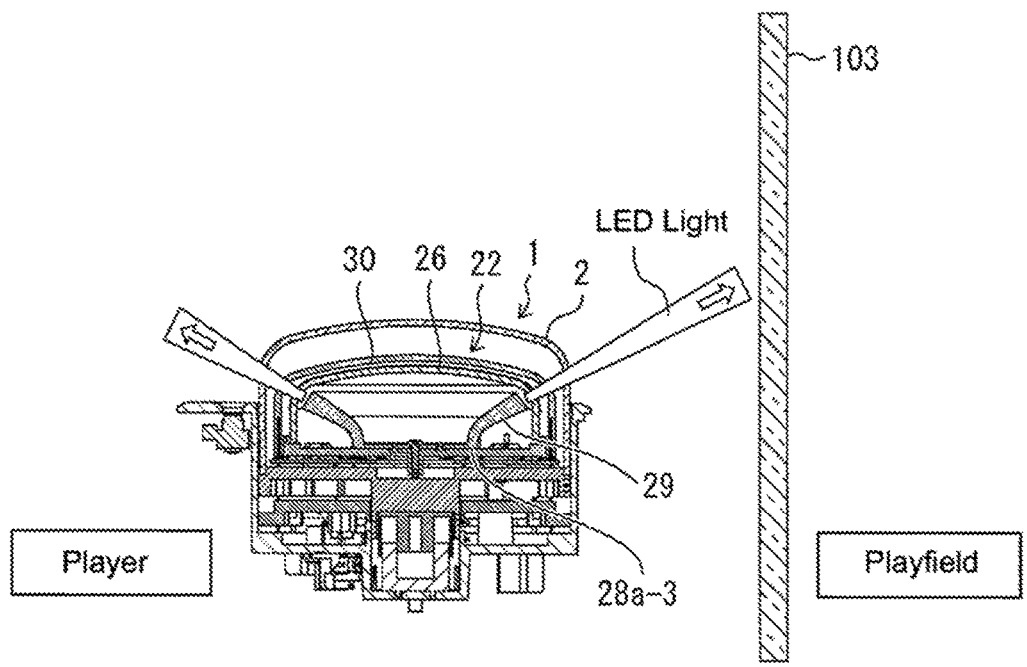
Figure 15:
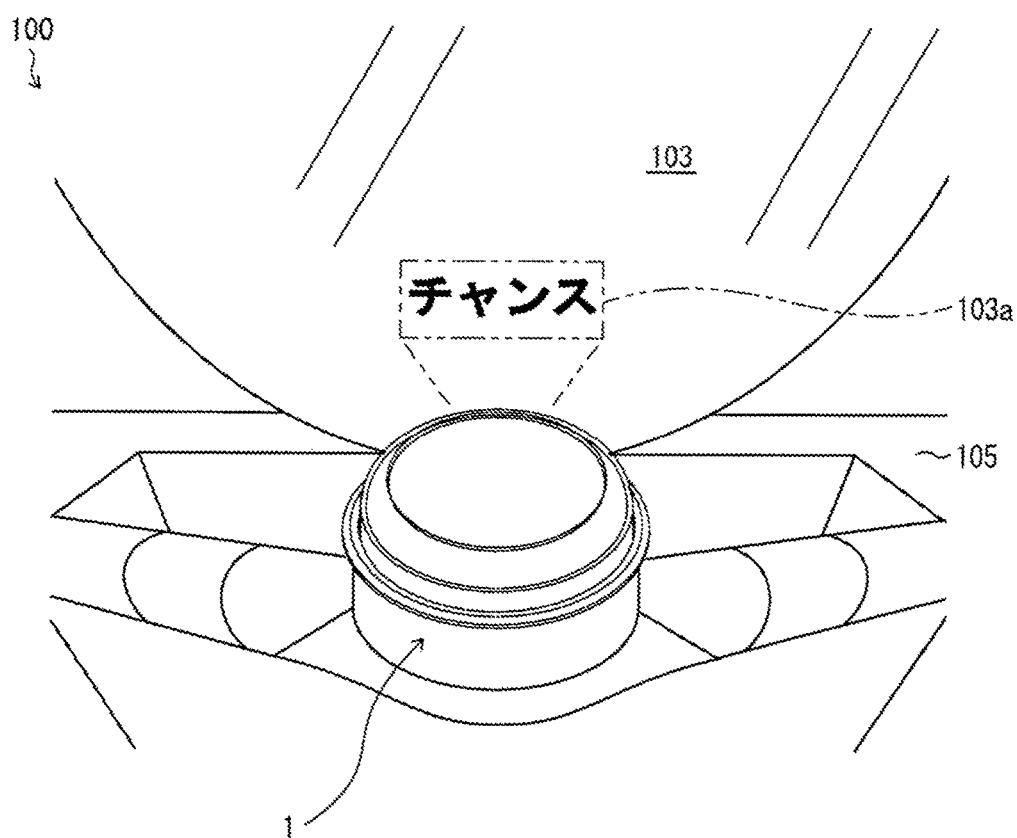
FIG. 15 is a component-level exploded view of the section on the above pachinko machine that reflects a first image.

The operation of the optical effect unit 22 is described next using FIG. 10, FIG. 13, FIG. 14, and FIG. 15. FIGS. 14A and 14B are for describing the presentation effects by the above optical effect unit 22 provided to the button device 1; FIG. 14A is a view of the button device 1 from above, and FIG. 14B is a view of the button device 1 from the side. FIG. 15 is an exploded view of the components in the pachinko machine 100 that reflect the first image.

When the innermost full-color LED elements 28a-3 (FIG. 10) on the substrate 28 are activated, light enters the light guiding lens 29 in the optical effect unit 22, travels through the light guiding lens 29, and exits diagonally upward from the output surface 29b. The outgoing light passes through the projection image 32 and the second image 33 (FIG. 13) retained on the printed sheet 30 at the curved portion 26e of the inner lens 26.

The outgoing (LED) light (FIGS. 14A and 14B) passing through the projection image 32 and producing the first image travels toward the glass panel 103, is reflected by a region 103a on the glass panel 103 (FIG. 15), and renders the first image visible. The region 103a is preferably near the starter pocket (not shown) or a win pocket (not shown) in the play area. The first image will be easier to see if this area is in a location immediately recognizable by the player, and is darker compared to in front of the display screen 106.

Additionally, the outgoing (LED) light that passes through the second image 33 allows the player of the pachinko machine 100 and players located on the left and right of the pachinko machine 100 to see a corresponding second image 33 (FIGS. 14A and 14B).

6. Effects of the Configuration

As above described, the button device 1 according to the embodiment is provided with the optical effect unit 22. The optical effect unit 22 is configured to illuminate the glass panel 103 covering the playfield 101 with light causing the glass panel 103 to reflect light and thereby produce a first image visible to the player.

Hereby, even a button device 1 located at the lower part of the playfield 101 where it is normally hard for the player to notice can provide an impactful presentation when the presentation effects produced uses the light entering the visual field of a player focused on the playfield 101.

Because the button device 1 acts as a source of illumination for producing the first image, this creates awareness of the button device 1, naturally prompting the player to focus on and operate the button device without requiring some other means such as presenting an image on the display screen 106 of the main unit 2 provided on the playfield 101 to urge the player to use the main unit 2.

In this case, for instance, presenting the first image may serve to prompt input via the main unit 2, thereby ensuring input via the main unit 2. The display screen 106 also no longer needs to display an image prompting input via the main unit 2; therefore, the display screen 106 may be used for other presentation effects, thus increasing the variety of presentation effects that may be built into the pachinko machine 100.

The projection image 32 retained on the printed sheet 30 may also be modified. Hereby, the first image shown on the transparent panel may be changed easily to allow the use of common components for different types of game machines, thereby controlling costs and making it possible to provide presentation effects according to the type of game machine, and new variations may be easily adopted.

Incidentally, pachinko machine 100 may be installed in environments that are brightly light by illumination devices. In order for the first image to be rendered visible by light reflected by the glass panel 103 in this environment, the light from the optical effect unit 22 that will produce the first image must illuminate the glass panel 103 with a certain level of intense light. The optical effect unit 22 achieves a certain level of intense light by employing the light guiding lens 29.

The button device 1 according to the embodiment is configured so that other than the projection image 32, the printed sheet 30 also retains a second image 33 which is directly visible to a player in front of the pachinko machine 100 as well as players at the left and right of the pachinko machine 100; the button device 1 is also configured so that the light guiding lens 29 outputs relatively intense light.

The relatively intense light output from the light guiding lens 29 is used to show the second image 33. Because the second image 33 appears brighter than the decorative image 31 presented using light guided by the inner lens 26, the player is able to perceive the second image 33 even when the same is shown together with the decorative image 31, to thereby creating a more impactful presentation.

The light guiding lens 29 may be configured so that the end of the light guiding lens 29 with the output surface 29b is thicker, and the strip-like output surface 29b is thick widthwise; hereby a larger first image may be observed reflecting from the glass panel 103.

Incidentally, the projection image 32 and the second image 33 are also visible when light from the full-color LED elements 28a-2 on the substrate 28 used to produce the decorative image 31 are introduced to the inner lens 26. Even if the light were not introduced to the inner lens 26, light from the illumination device in the game parlor could also render the projection image 32 and the second image 33 visible. The effects presented by activating the light guiding lens 29 to show the first image and the second image 33 may be less effective.

In contrast, a more preferable configuration of the button device 1 in the embodiment would be to reduce the visibility of non-illuminating light from the light guiding lens 29 by printing the projection image 32 and the second image 33 in half tones. Hereby it is possible to avoid reduced effectiveness of the presentation effects of the first image and the second image 33 via light from the light guiding lens 29.

Despite the main unit 2 of the button device 1 according to the embodiment is configured to appear circular in a top view, the main unit may appear rectangular, or appear to be some other shape in a top view. If the main unit 2 is rectangular, then preferably the outer lens, inner lens, and output surface of the light guiding lens are also rectangular; similarly, the rectangular main unit 2 is preferable, and a rectangular light guiding lens, inner lens, and outer lens are within the scope of the present invention.

The light guiding lens 29 in the button device 1 according to the embodiment is given a bowl-like shape with a circular output surface 29b; however, if only the first image needs to be perceivable, then the light guiding lens 29 may be cut into a pie wedge with the output surface 29b oriented toward the glass panel 103.

Second Embodiment

Another embodiment of the invention is described. The parts of this embodiment that are distinct from the first embodiment are described.

The button device 1 according to the embodiment is provided with an optical effect unit 22A instead of optical effect unit 22. This is one distinction with the button device 1 provided in the first embodiment.

Figure 16:
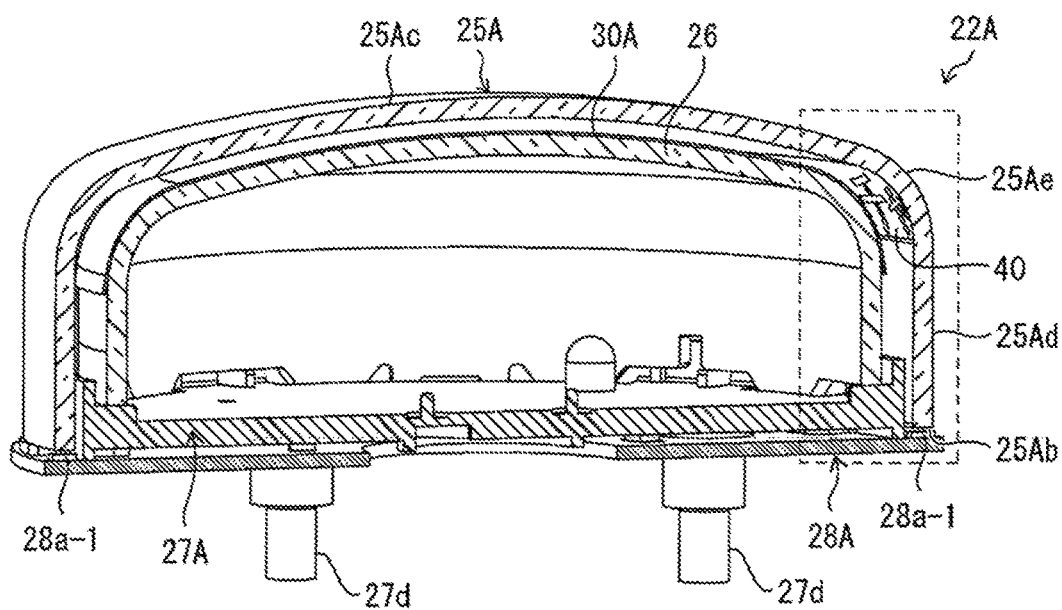
FIG. 16 is a cross-sectional perspective view of the optical effect unit provided to a button device according to another embodiment.
Figure 17:
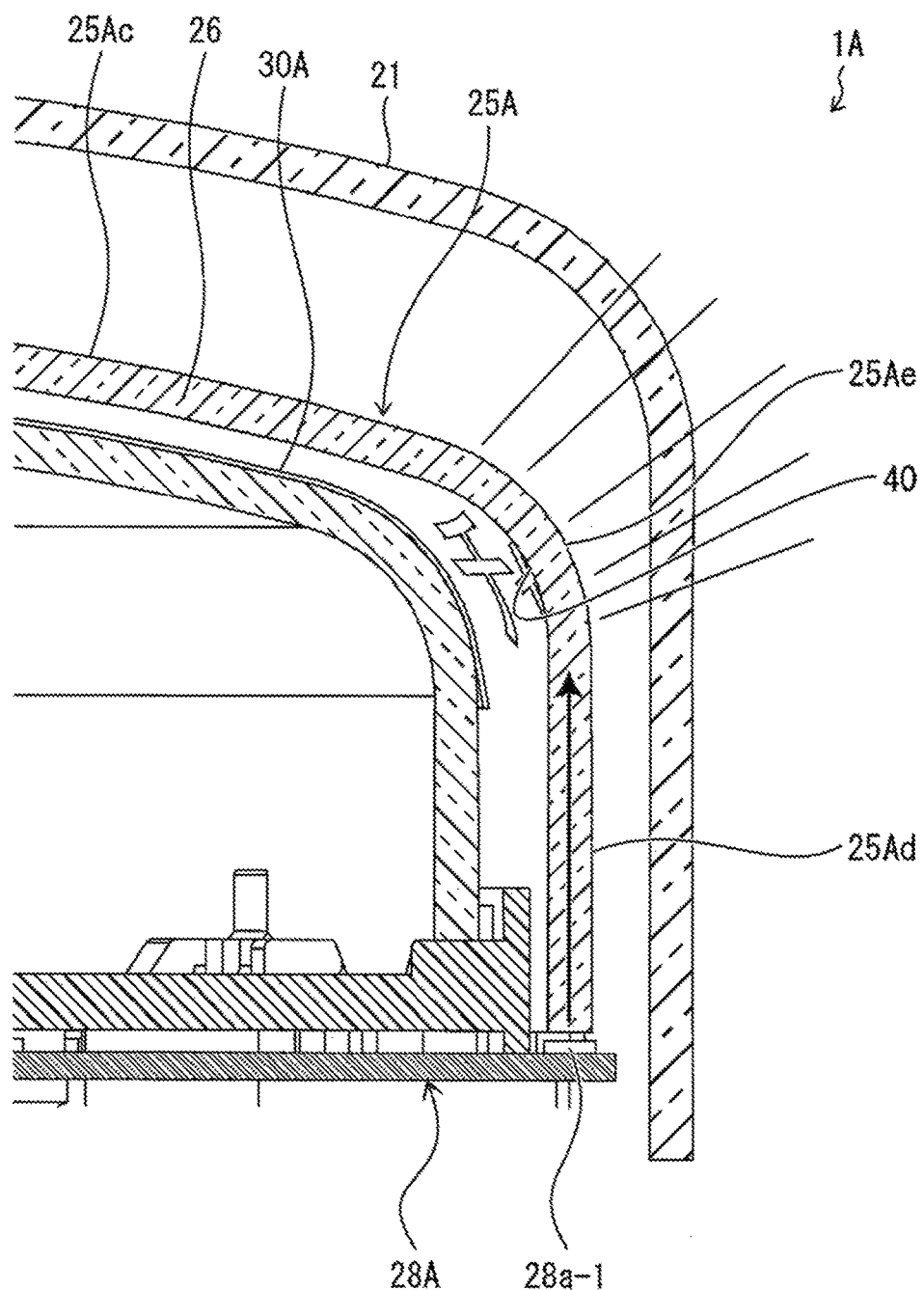
FIG. 17 is an exploded view illustrating the portion encircled by dotted lines in FIG. 16.
Figure 18A:
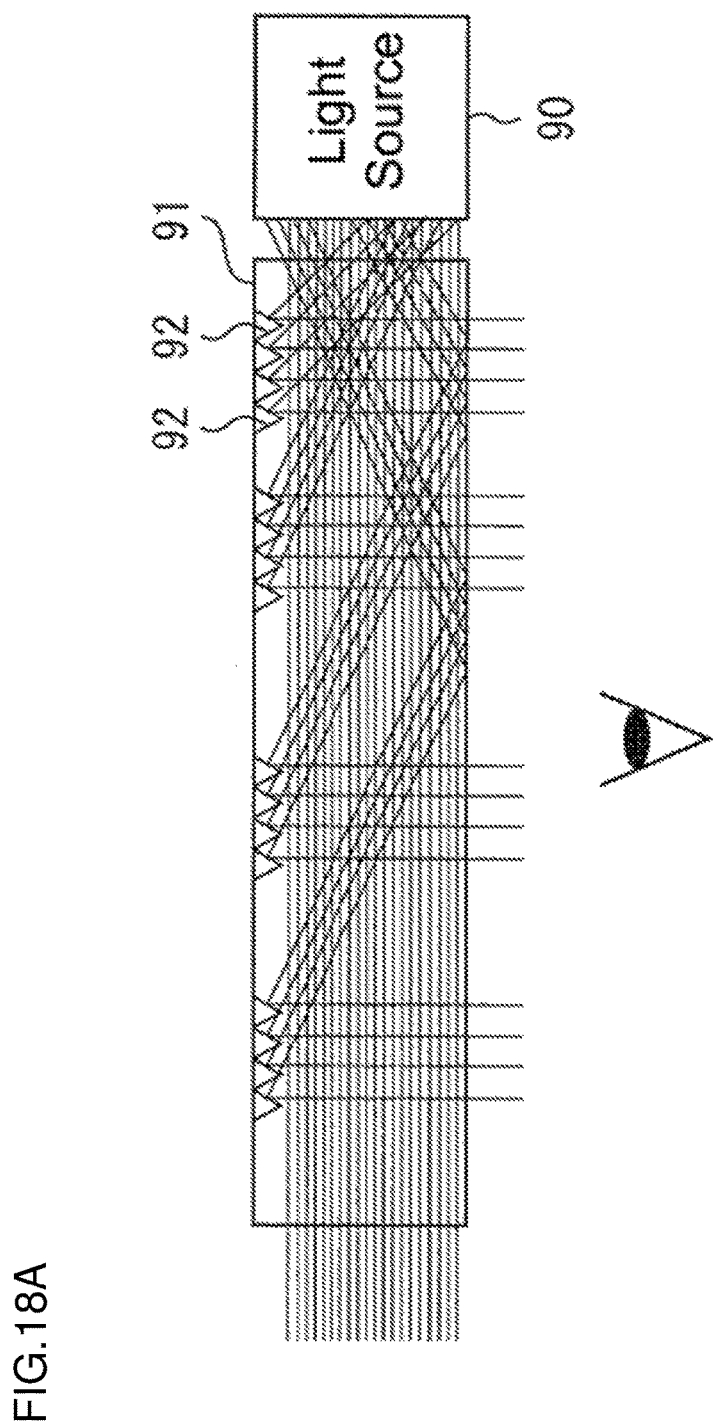
FIGS. 18A, 18B and 18C are for describing the light diffusing pattern formed on an outer lens provided to the above optical effect unit.
Figure 18B:
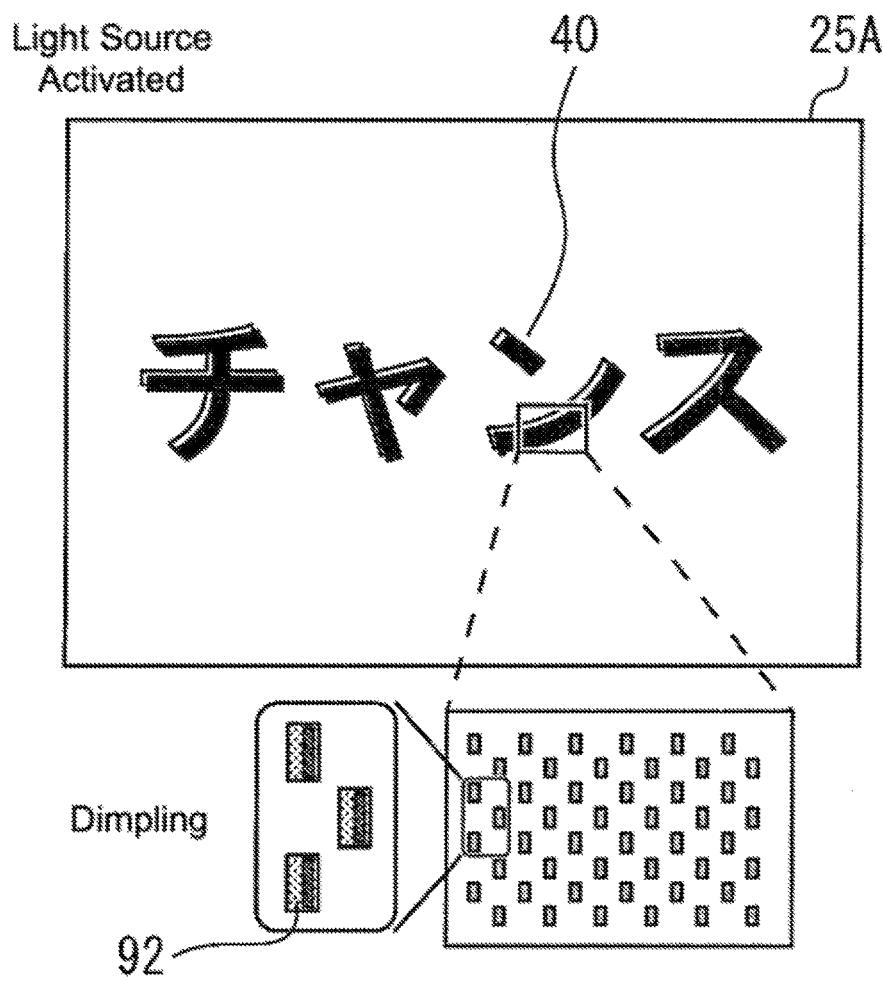
Figure 18C:
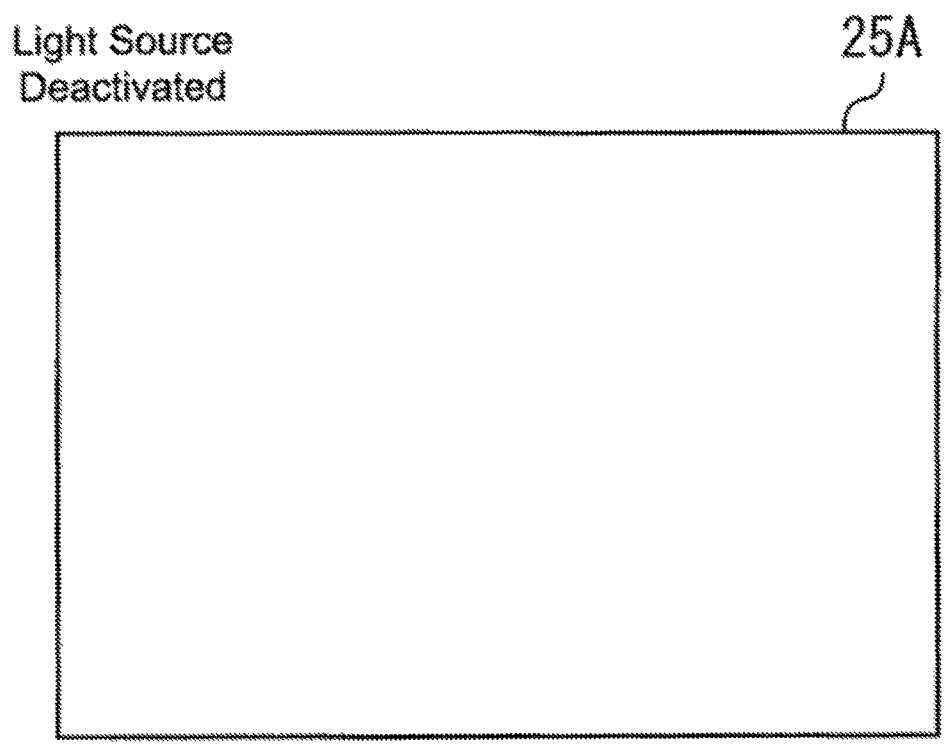

FIG. 16 is a cross-sectional perspective view of the optical effect unit 22A provided in the button device 1, and is a view of the section along the operation direction (vertical direction) of the button device 1. FIG. 17 is an exploded view illustrating the portion encircled by dotted lines in FIG. 16; however, view angle is slightly different from the cross-section in FIG. 16 and also depicts the cover 21. FIGS. 18A, 18B and 18C are for describing the light diffusing pattern formed on an outer lens 25A provided to the above optical effect unit; FIG. 18A illustrates how light is output by the light diffusing pattern; FIG. 18B illustrates how the pattern appears when the light source is activated; and FIG. 18C illustrates how the pattern appears when the light source is deactivated.

As illustrated in FIG. 16, the optical effect unit 22A does not include the light guiding lens 29, and instead of the substrate 28 is provided with a substrate 28A wherein there is no innermost full-color LED elements 28a-3 corresponding to the light guiding lens 29; additionally, instead of the base unit 27 the optical effect unit 22A includes a base unit 27A that does not include the hole 27c corresponding to the innermost full-color LED elements 28a-3.

The optical effect unit 22A also includes instead of the printed sheet 30, a printed sheet 30A integrally formed with the inner lens 26, and instead of the outer lens 25 and outer lens 25A. The printed sheet 30A differs from the printed sheet 30 in that the printed sheet 30A does not hold the projection image 32 for producing the first image and the second image 33.

The outer lens 25A and the outer lens 25 differ in that the outer lens 25A includes a light diffusing pattern 40 formed on the front, rear, or both surfaces of a rounded section 25Ae from the top surface 25Ac to the trunk 25Ad. The light diffusing pattern 40 outputs the light that creates the first image using the same technique that forms the presentation image (not shown). The portion of the outer lens 25A having the light diffusing pattern 40 is oriented toward the glass panel 103 (FIG. 1) with the button device 1 attached to the pachinko machine 100.

With this configuration, light from the full-color LED elements 28a-1 guided into the outer lens 25A from the lower part 25Ab, exits from the light diffusing pattern 40 and radiates towards the glass panel 103; on reflecting from the glass panel 103 the light becomes a first image perceivable by the player Ad illustrated in FIG. 18A, light output from a light source 90 (which corresponds to the full-color LED elements 28a-1) and is guided into a light guiding component 91 (which corresponds to the outer lens 25A) from one end thereof, is totally reflected through the light guiding component 91, transmitted to the other end, and exits from the other end. During that time, the fine bumps and recesses 92 (i.e., dimples) on the surface of the light guiding component 91 which make up the light diffusing pattern act on the light satisfying the conditions for total reflection, and exit from the surface of the light guiding component 91. Light output from the light diffusing pattern allows the presentation image (not shown) to be directly perceived. The first image can be directly perceived due to light output from the light diffusing pattern and reflected from the glass panel 103.

Note that, while in FIG. 18A the light diffusing patterns are formed on the rear surface opposite the front surface from which light satisfying the total reflection conditions in the light guiding component 921 is output, the light diffusing pattern may be provided on the front surface or both the front and rear surface. Light from the light diffusing pattern 40 is reflected and displays the first image; the light diffusing pattern 40 usually flipped in the reverse direction of the light diffusing pattern that produces the directly perceivable presentation image. That is, if the light diffusing pattern is on the front surface, when viewed from the front surface, the light diffusing pattern for rendering the presentation image appear as the presentation image; however, the light diffusing pattern for the first image is a mirror image. In contrast, if the light diffusing pattern is on the rear surface, when viewed from the rear surface, the light diffusing pattern for rendering the first image appears as the first image, however the light diffusing pattern for the presentation image is a mirror image.

The light diffusing pattern 40 outputs light when the light source (full-color LED elements 28a-1) is activated (FIG. 18B); the light diffusing pattern 40 outputs no light when the light source (full-color LED elements 28a-1), and therefor the light diffusing pattern 40 cannot be seen (FIG. 18C).

Returning to FIG. 17, as illustrated, when the outermost full-color LED elements 28a-1 on the substrate 28A is activated, the light therefrom enters the outer lens 25A in the optical effect unit 22A, travels through the outer lens 25A and is output diagonally upward from the light diffusing pattern 40 while traveling through the outer lens.

Figure 19A:
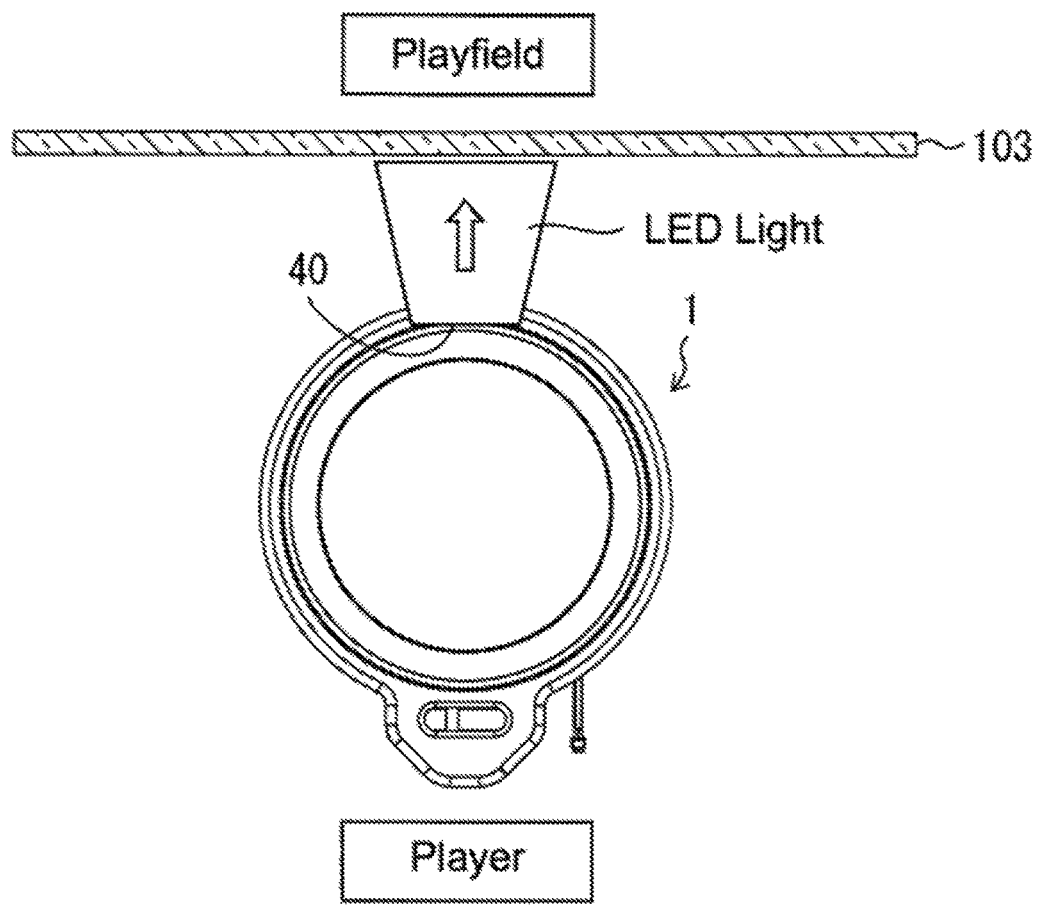
FIGS. 19A and 19B are for describing the presentation effects produced by the above optical effect unit provided to the button device.
Figure 19B:
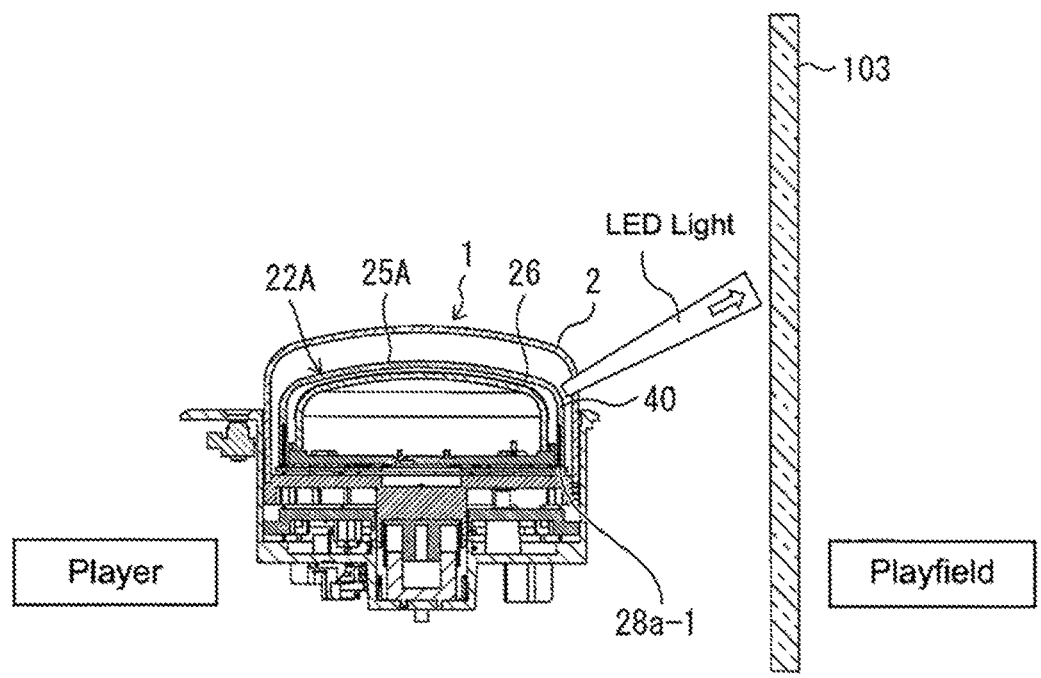

FIGS. 19A and 19B are for describing the presentation effects produced by the above optical effect unit 22A provided to the button device 1; FIG. 19A is a view of the button device 1 from above, and FIG. 19B is a view the button device 1 from the side.

As illustrated in FIGS. 19A and 19B, the outgoing (LED) light output from the light diffusing pattern 40 to create the first image radiates toward the glass panel 103. Light radiating toward the glass panel 103 is reflected at a region 103a on the glass panel 103 and renders the first image visible.

The rounded section 25Ae of the outer lens 25A in the optical effect unit 22A includes only the light diffusing pattern 40, which outputs light that produces the first image (FIG. 16); however this is just one example. The section 25Ae may also include a light diffusing pattern that shows a second image that is directly perceivable by the player. The light diffusing pattern for showing a second image that is directly perceivable by the player may be formed similarly to the light diffusing pattern for creating the presentation image (not shown), i.e., on the top surface 25Ac of the outer lens 25A.

Figure 20:
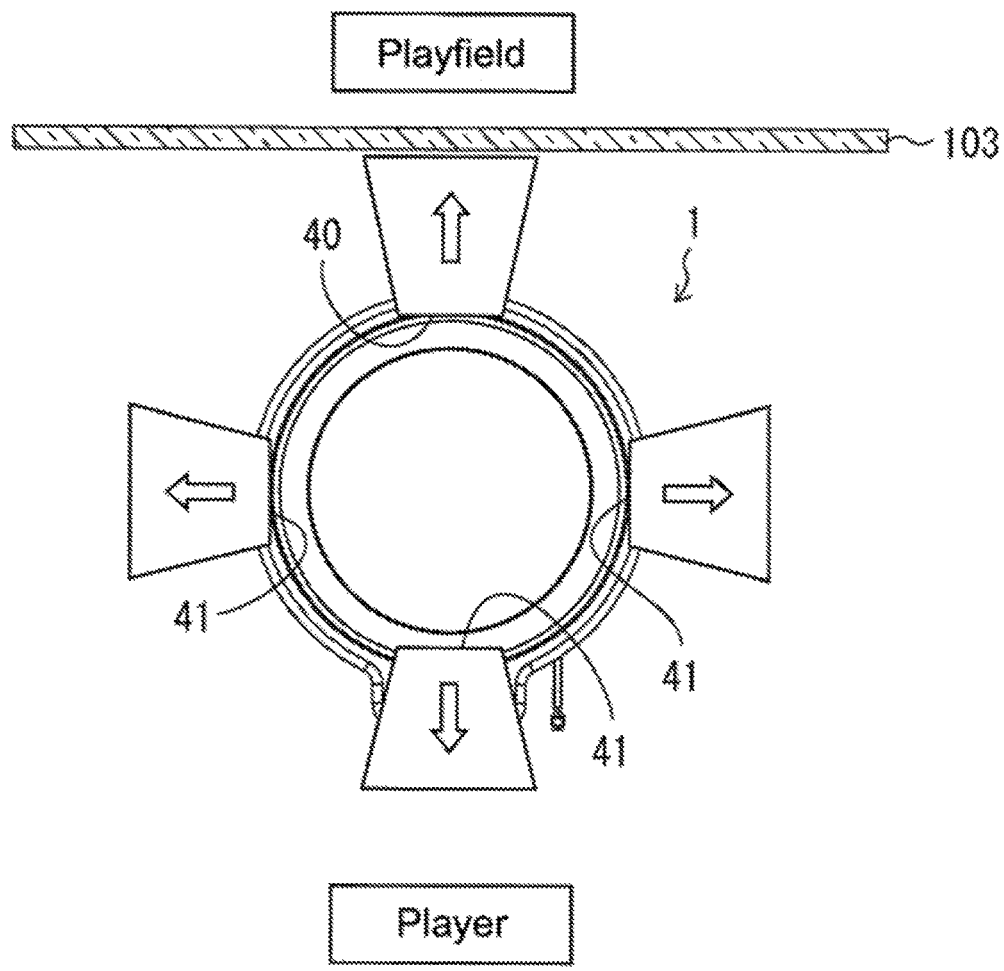
FIG. 20 is a diagram for describing the presentation effects produced by the above optical effect unit, and is a view of the button device from above.

FIG. 20 is a view of the button device 1 from above, and is for describing a modified version of light diffusing patterns in the optical effect unit 22A and the presentation effects produced thereby. More specifically, the rounded section 25Ae of the outer lens 25A includes the light diffusing pattern 40 which outputs the light creating the first image, and a light diffusing pattern 41 for creating a second image directly perceivable by the player.

In addition to outgoing (LED) light from the light diffusing pattern 40 which produces the first image, the outgoing (LED) light from the light diffusing pattern 41 produces a corresponding second image that is directly visible to the player of the pachinko machine 100 and players on the left and right of the pachinko machine 100 (FIG. 20).

The position at which the first image is rendered visible may be modified with the outer lens 25A configured to present the first image; more specifically, changing the curvature of the rounded section 25Ae on the outer lens 25A, or creating a beveled instead of a rounded edge changes the position at which the first image reflects from the glass panel 103 and is rendered visible. In addition, providing a larger rounded section 25Ae or a larger tapered section makes it easier to increase the size of the first image reflected from the glass panel 103 and rendered visible, compared to a configuration that requires increasing the thickness of the light guiding lens 29.

Third Embodiment

Another embodiment of the invention is described. The parts of this embodiment that are distinct from the first and second embodiments are described.

The button device 1 according to the embodiment is provided with an optical effect unit 22B instead of optical effect unit 22. This is one distinction with the button device 1 provided in the first embodiment.

Figure 21:
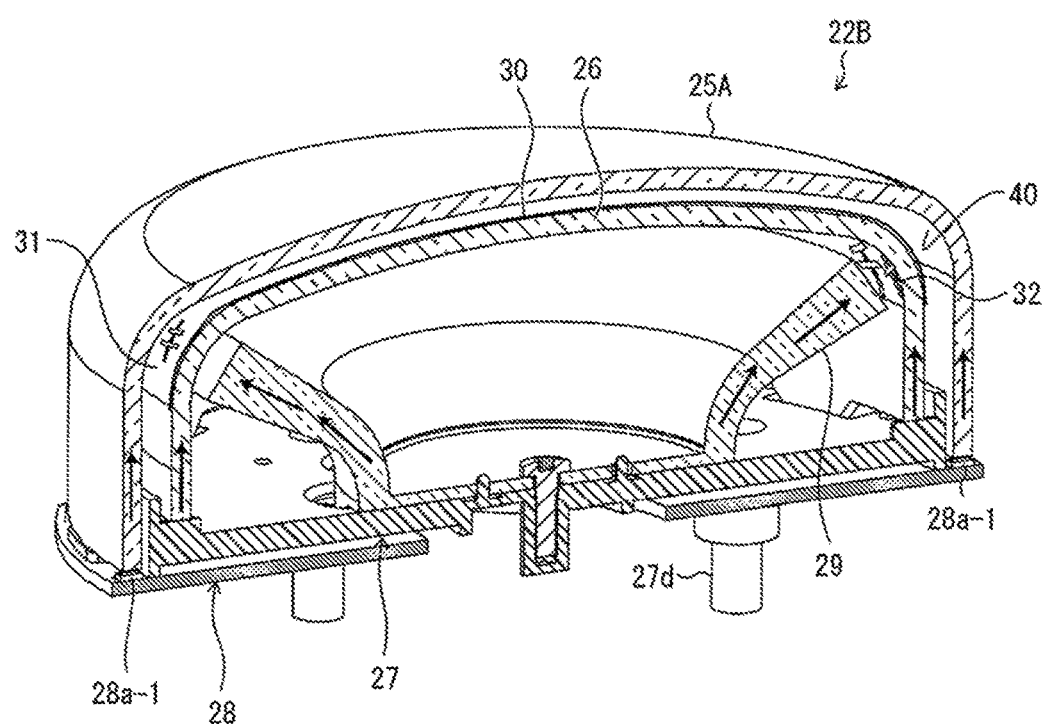
FIG. 21 is a cross-sectional perspective view of the optical effect unit provided to a button device according to another embodiment.

FIG. 21 is a cross-sectional perspective view of the optical effect unit 22B provided in the button device 1, and is a view of the section along the operation direction (vertical direction) of the button device 1. As illustrated in FIG. 21, the optical effect unit 22B is provided with the light guiding lens 29 and the inner lens 26 in the optical effect unit 22, as well as the outer lens 25A in the optical effect unit 22A. Here, the inner lens 26 and printed sheet 30 that retains the projection image 32 for creating the first image are integrally molded, and the light diffusing pattern 40 for creating the first image are formed on the outer lens 25A.

Figure 22:
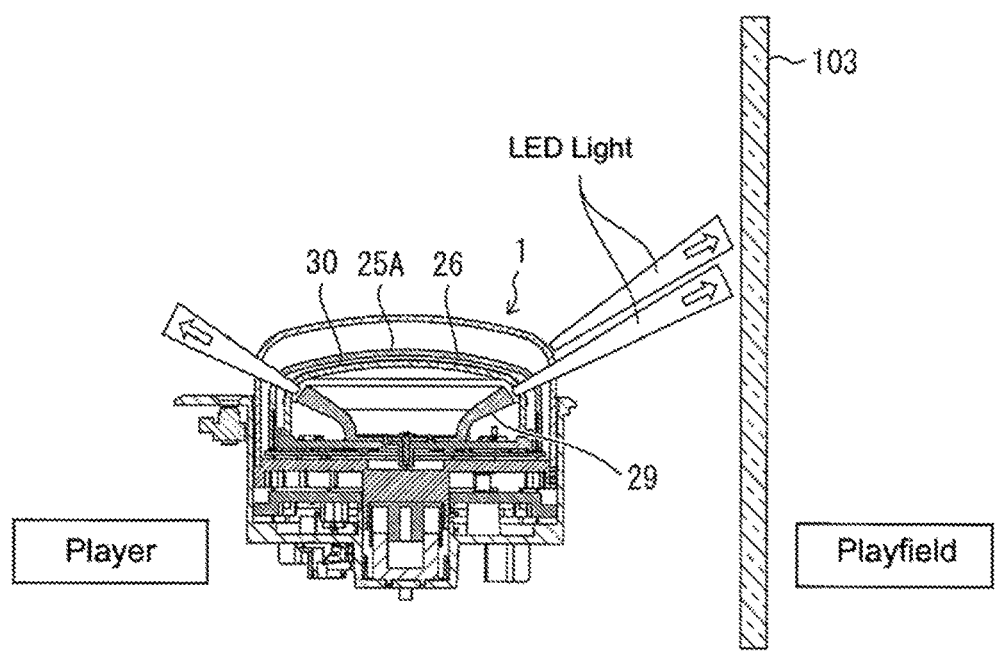
FIG. 22 is a diagram for describing the presentation effects produced by the above optical effect unit in the button device, and is a view of the button device from the side.

FIG. 22 is for describing the presentation effects produced by the optical effect unit 22B in the button device 1, and is a view of the button device 1 from the side. As illustrated in FIG. 21, the above described configuration illuminates the glass panel 103 with the outgoing (LED) light that exits the light guiding lens 29 and enters the projection image 32 when passing through the printed sheet 30 to produce the first image, and outgoing (LED) light that enters the outer lens 25A and exits from the light diffusing pattern 40 to produce the first image. More information may thus be reflected from the glass panel 103 and be made visible to the player.

Note that in the configuration depicted in FIG. 22, only the second image directly perceivable by the player is provided on the printed sheet 30; however, a light diffusing pattern in the form of the second image may also be provided to the outer lens 25A.

With this configuration the innermost full-color LED elements 28*a*-3 that supply light to the light guiding lens 29 (FIG. 10) and the outermost full-color LED elements 28*a*-1 that supply light to the outer lens 25A (FIG. 21) may be activated at different times to create more complex optical presentation effects and increase the range of available optical presentation effects.

Modification Examples

Possible modifications that may be adopted in above embodiments are described. In the above embodiments the button device 1 is installed on a pachinko machine 100 as the game machine. Light radiates from the button device 1 toward the playfield 101 and is reflected by a region 103*a* on the glass panel 103 to render a first image visible (FIG. 15).

Figure 23:
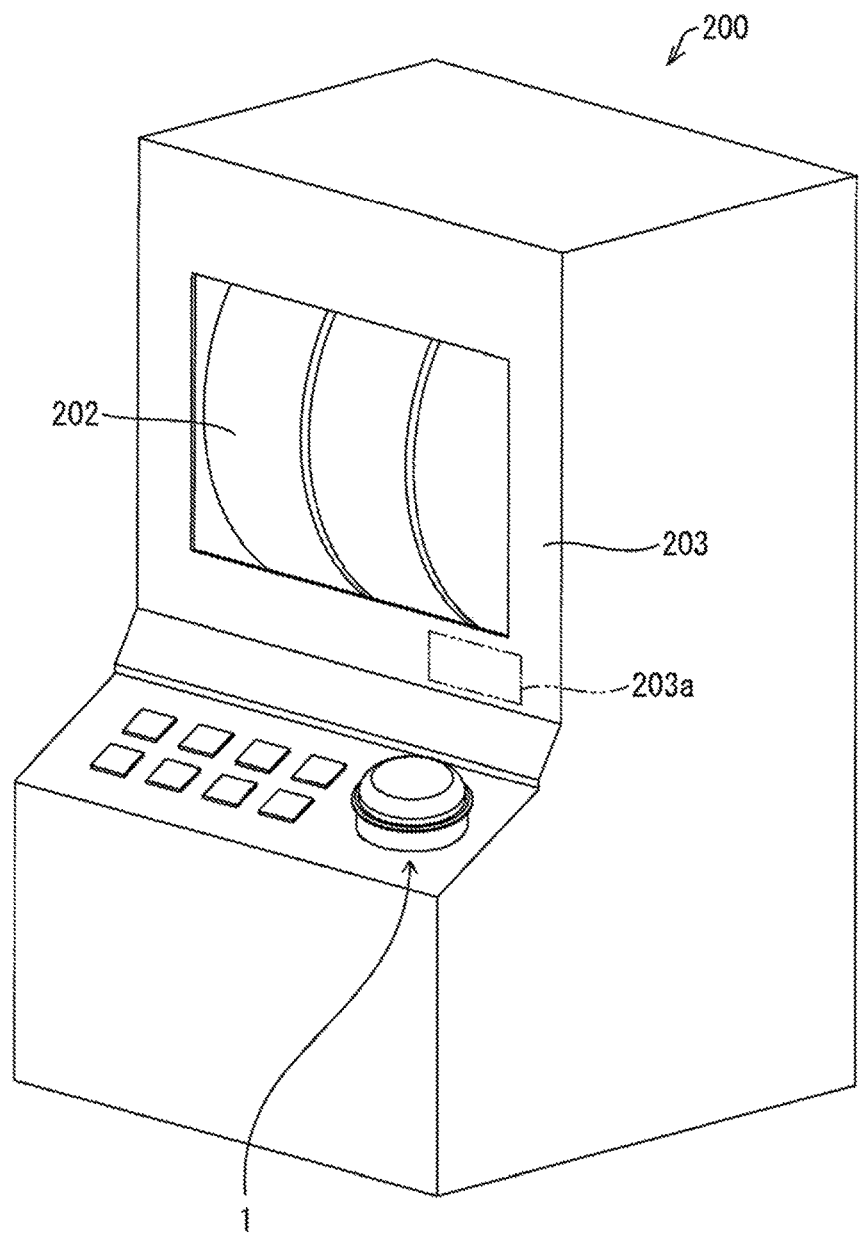
FIG. 23 is a schematic front view of a slot machine with a button device according to embodiments and modifications of the present invention.

As an example, this configuration may be modified as depicted in FIG. 23, where the button device 1 is installed in a slot machine 200 as the game machine; here, light radiates from the button device 1 toward the playfield 202 and projects the first image onto a region 203*a* on a frame surrounding the playfield 202 to render the first image visible. The frame 203 covering and surrounding the playfield 202 may be provided with a screen to increase the visibility of the first image.

The present invention is not limited to each of the above described embodiments, and may be modified in various ways and remain within the scope of the claims. The technical means disclosed in each of the different embodiments may be combined as appropriate, and an embodiment obtained in such a manner remains within the technical scope of the present invention.

The invention claimed is:

1. A game machine input device to be mounted on a game machine provided with a playfield, the game machine input device comprising:
   a button device provided toward a front of the playfield and comprising:
   a cup-shaped transparent support provided with a top surface having a decorative image capable of being visible to a player, the cup-shaped transparent support comprising: a trunk having a lower opening end; and a portion that is inclined or rounded from a peripheral edge of the top surface to the trunk, the portion comprising a first image; and
   an input element capable of being pressed and moved to accept input; and
   a projector radiating light through the first image toward the playfield to project the first image in a region within a visual field for viewing the playfield.

2. The game machine input device according claim 1, further comprising: a transparent panel covering the front of the playfield in the game machine; wherein
   the projector radiates light through the first image toward the transparent panel such that the radiated first image is reflected by a reflective area of the transparent panel and a reflection of the first image appears on the reflective area of the transparent panel.

3. The game machine input device according to claim 1, wherein the projector comprises:
   a light source; and
   a light guiding lens including one end opposed to the light source and another end opposed to the first image, the light guiding lens outputting light introduced at the one end thereof by the light source from the another end that serves as an output surface.

4. The game machine input device according to claim 3, wherein
   the light guiding lens is arranged toward an inside of the cup-shaped transparent support.

5. The game machine input device according to claim 4, wherein the output surface of the light guiding lens is circular or rectangular; and
   the inclined or rounded portion comprises a second image capable of being directly visible via light output by the light guiding lens.

6. The game machine input device according to claim 4, wherein the first image is processed to reduce the visibility thereof due to light other than light output from the light guiding lens.

7. The game machine input device according to claim 5, wherein the first image or the second image, or both the first image and the second image are processed to reduce the visibility thereof due light other than light output from the light guiding lens.

\* \* \* \* \*